United States Patent
Schoenberg

(10) Patent No.: US 9,266,535 B2
(45) Date of Patent: Feb. 23, 2016

(54) SYSTEMS AND METHODS FOR DETERMINING IF A CHILD SAFETY SEAT IS IN A MOVING VEHICLE

(71) Applicant: Cars-N-Kids LLC, St. Louis, MO (US)

(72) Inventor: Gregory B. Schoenberg, St. Louis, MO (US)

(73) Assignee: Cars-N-Kids LLC, St. Louis, MO (US)

( * ) Notice: Subject to any disclaimer, the term of this patent is extended or adjusted under 35 U.S.C. 154(b) by 65 days.

(21) Appl. No.: 14/205,707

(22) Filed: Mar. 12, 2014

(65) Prior Publication Data

US 2014/0253313 A1    Sep. 11, 2014

Related U.S. Application Data

(63) Continuation-in-part of application No. 13/370,021, filed on Feb. 9, 2012, which is a continuation-in-part of application No. 12/335,421, filed on Dec. 15, 2008, now Pat. No. 8,212,665.

(60) Provisional application No. 61/013,929, filed on Dec. 14, 2007, provisional application No. 61/441,199, filed on Feb. 9, 2011, provisional application No. 61/504,113, filed on Jul. 1, 2011, provisional application No. 61/538,647, filed on Sep. 23, 2011.

(51) Int. Cl.
| | |
|---|---|
| *G08B 21/00* | (2006.01) |
| *B60W 40/10* | (2012.01) |
| *B60N 2/00* | (2006.01) |
| *G08B 21/22* | (2006.01) |
| *B60N 2/28* | (2006.01) |
| *G08B 21/24* | (2006.01) |
| *B60R 21/015* | (2006.01) |
| *G08B 25/00* | (2006.01) |

(52) U.S. Cl.
CPC ............ *B60W 40/10* (2013.01); *B60N 2/002* (2013.01); *B60N 2/28* (2013.01); *B60N 2/2812* (2013.01); *B60R 21/01526* (2014.10); *G08B 21/22* (2013.01); *G08B 21/24* (2013.01); *G08B 25/005* (2013.01)

(58) Field of Classification Search
CPC ........ B60Q 9/00; B60R 22/105; G08B 21/02; G08B 21/22
USPC ................ 340/573.1, 573.4, 584, 457, 521
See application file for complete search history.

(56) References Cited

U.S. PATENT DOCUMENTS

| | | |
|---|---|---|
| 5,790,031 A | 8/1998 | Shelton et al. |
| 5,793,291 A | 8/1998 | Thornton |

(Continued)

FOREIGN PATENT DOCUMENTS

WO    2009079477 A2    6/2009

OTHER PUBLICATIONS

Halo, "The Halo Baby Seat Safety System," http://sistersofinvention.com/child_products/readch.html, printed on Jul. 18, 2012, 2 pages.

(Continued)

*Primary Examiner* — Mark Rushing
(74) *Attorney, Agent, or Firm* — Lewis Rice LLC

(57) ABSTRACT

Systems and methods which provide for an alarm or notification that a child is in a car seat. The systems generally determine if a child is in the seat and that the seat, and therefore the vehicle, is not in motion. Upon detecting both situations, the notification or alarm is activated. The system will generally provide for an alarm to a smartphone or other remote notification device to improve the likelihood that the alarm will be received.

2 Claims, 39 Drawing Sheets

(56) References Cited

U.S. PATENT DOCUMENTS

| | | | |
|---|---|---|---|
| 5,966,070 | A | 10/1999 | Thornton |
| 6,236,333 | B1 | 5/2001 | King |
| 6,366,200 | B1 | 4/2002 | Aoki |
| 6,448,895 | B1 | 9/2002 | Ekkel |
| 6,480,103 | B1 | 11/2002 | McCarthy et al. |
| 6,794,590 | B2 | 9/2004 | Federspiel |
| 6,798,084 | B1 | 9/2004 | Gobel et al. |
| 6,819,247 | B2 * | 11/2004 | Birnbach et al. ........... 340/573.1 |
| 6,819,249 | B1 | 11/2004 | Papp |
| 6,847,302 | B2 | 1/2005 | Flanagan et al. |
| 6,850,824 | B2 | 2/2005 | Breed |
| 6,868,734 | B2 | 3/2005 | Jakoby et al. |
| 6,922,622 | B2 | 7/2005 | Dulin et al. |
| 6,924,742 | B2 | 8/2005 | Mesina |
| 6,998,988 | B1 | 2/2006 | Kalce |
| 7,009,522 | B2 | 3/2006 | Flanagan et al. |
| 7,012,533 | B2 | 3/2006 | Younse |
| 7,170,401 | B1 | 1/2007 | Cole |
| 7,319,382 | B1 | 1/2008 | Vu |
| 7,325,870 | B2 | 2/2008 | Lawrence et al. |
| 7,348,880 | B2 | 3/2008 | Hules et al. |
| 7,378,974 | B1 | 5/2008 | Bassett et al. |
| 7,438,880 | B2 | 10/2008 | Hung et al. |
| 7,457,695 | B1 | 11/2008 | Fields et al. |
| 7,567,181 | B1 | 7/2009 | Davison |
| 7,650,864 | B2 | 1/2010 | Hassan |
| 7,701,358 | B1 | 4/2010 | White et al. |
| 7,714,737 | B1 | 5/2010 | Morningstar |
| 7,830,270 | B1 | 11/2010 | Philbert |
| 7,994,906 | B2 | 8/2011 | Salazar |
| 8,058,983 | B1 | 11/2011 | Davisson et al. |
| 8,063,788 | B1 | 11/2011 | Morningstar |
| 8,217,796 | B2 | 7/2012 | Trummer |
| 2002/0118121 | A1 * | 8/2002 | Lehrman et al. ......... 340/870.16 |
| 2003/0098792 | A1 | 5/2003 | Edwards et al. |
| 2003/0128107 | A1 | 7/2003 | Wilkerson |
| 2003/0160689 | A1 | 8/2003 | Yazdgerdi |
| 2003/0222775 | A1 | 12/2003 | Rackham et al. |
| 2004/0011277 | A1 | 1/2004 | Barnes et al. |
| 2004/0075581 | A1 | 4/2004 | Staniszewski |
| 2005/0035862 | A1 | 2/2005 | Wildman et al. |
| 2005/0068162 | A1 | 3/2005 | Santa Cruz et al. |
| 2005/0137462 | A1 | 6/2005 | Cho |
| 2005/0280297 | A1 | 12/2005 | Patterson et al. |
| 2006/0049929 | A1 | 3/2006 | Lawrence et al. |
| 2006/0103516 | A1 | 5/2006 | Zang |
| 2006/0111821 | A1 | 5/2006 | Wallner et al. |
| 2006/0208911 | A1 | 9/2006 | Davis |
| 2007/0055428 | A1 | 3/2007 | Kong et al. |
| 2008/0052259 | A1 | 2/2008 | Shiffman et al. |
| 2008/0055064 | A1 | 3/2008 | Keith et al. |
| 2008/0088437 | A1 | 4/2008 | Aninye et al. |
| 2008/0164990 | A1 | 7/2008 | Anderson |
| 2008/0167806 | A1 | 7/2008 | Wheeler et al. |
| 2009/0234542 | A1 | 9/2009 | Orlewski |
| 2009/0292423 | A1 | 11/2009 | Norton |
| 2009/0303025 | A1 | 12/2009 | Wahlstrom |
| 2010/0253498 | A1 | 10/2010 | Rork et al. |
| 2010/0264706 | A1 | 10/2010 | Vogt et al. |
| 2013/0021476 | A1 | 1/2013 | Trummer |
| 2013/0049955 | A1 | 2/2013 | Hoover et al. |
| 2013/0201013 | A1 | 8/2013 | Schoenberg |
| 2013/0278408 | A1 | 10/2013 | Schoenberg et al. |

OTHER PUBLICATIONS

International Search Report, International Patent Application No. PCT/US2008/086882, mailed on Jun. 29, 2009, 11 pages.

International Search Report, International Patent Application No. PCT/US12/24529, mailed on Oct. 18, 2012, 10 pages.

International Search Report, International Patent Application No. PCT/US12/59583, mailed on Mar. 20, 2013, 11 pages.

International Search Report, International Patent Application No. PCT/US13/50610, mailed on Oct. 14, 2013, 13 pages.

"PMV16UN, Product Data Sheet, NXP B.V.", http://www.nxp.com/documents/data_sheet/PMV16UN.pdf, Apr. 2011, 16 pages.

"Zeners BzX84C 3V3—BZX84C 33," Fairchild Semiconductor Corporation, http://www.fairchildsemi.com/ds/BZ/BZX84C9V1.pdf, 2001, 4 pages.

International Search Report, International Patent Application No. PCT/US2014/070752, mailed on Apr. 1, 2015, 12 pages.

International Search Report, International Patent Application No. PCT/US2015/020209, mailed on Jun. 1, 2015, 10 pages.

* cited by examiner

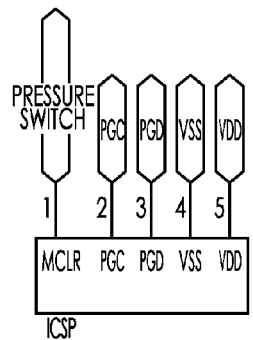
FROM FIG. 5D — Fig. 5E — TO FIG. 5F
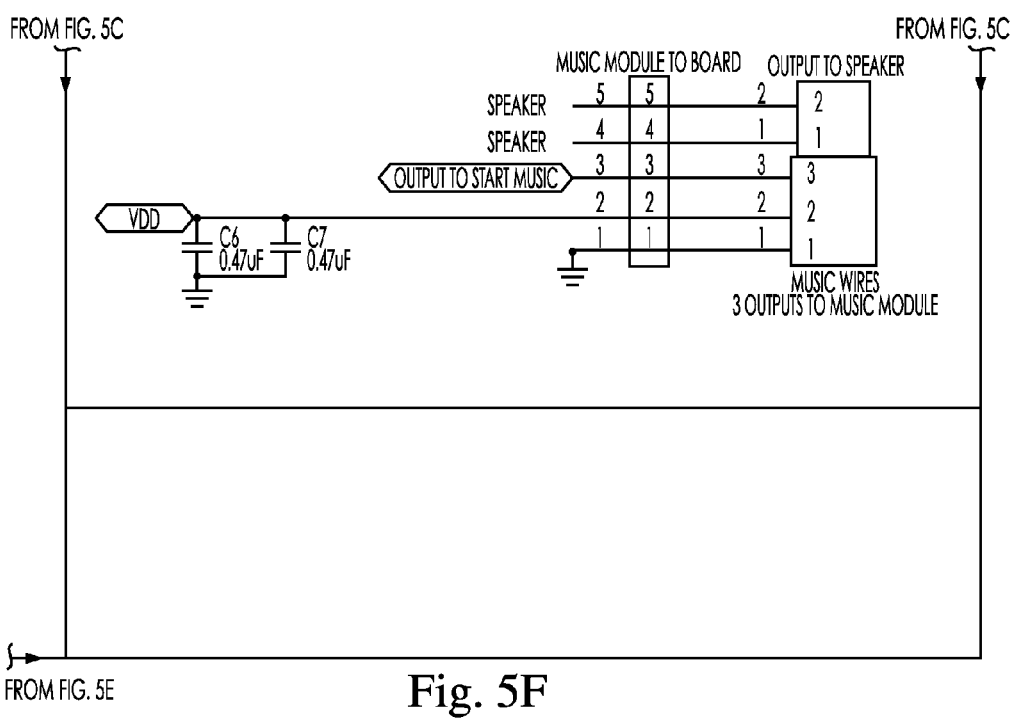
Fig. 5F

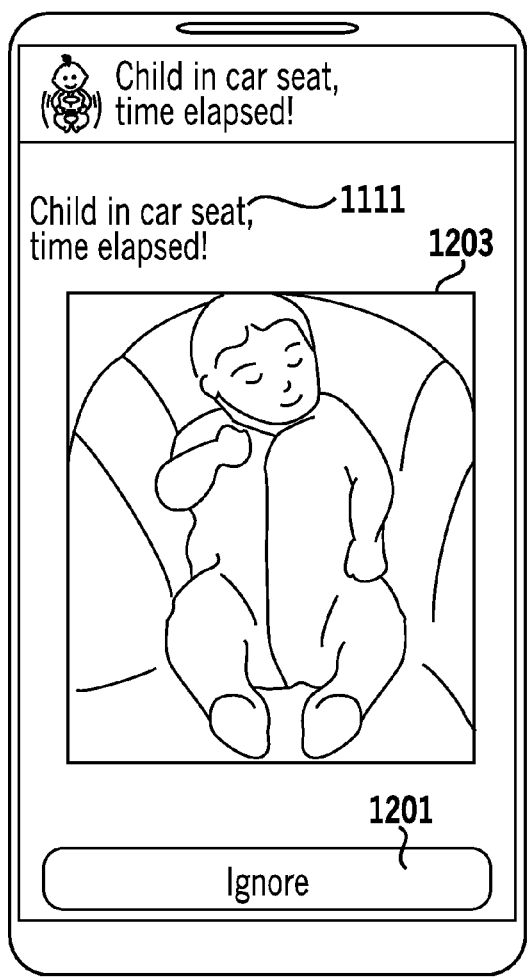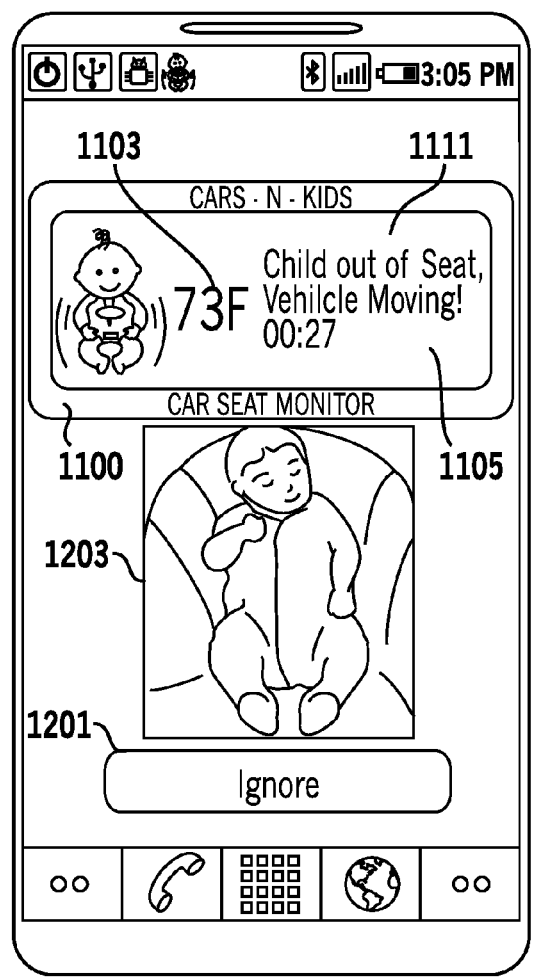
Figure 13                    Figure 14

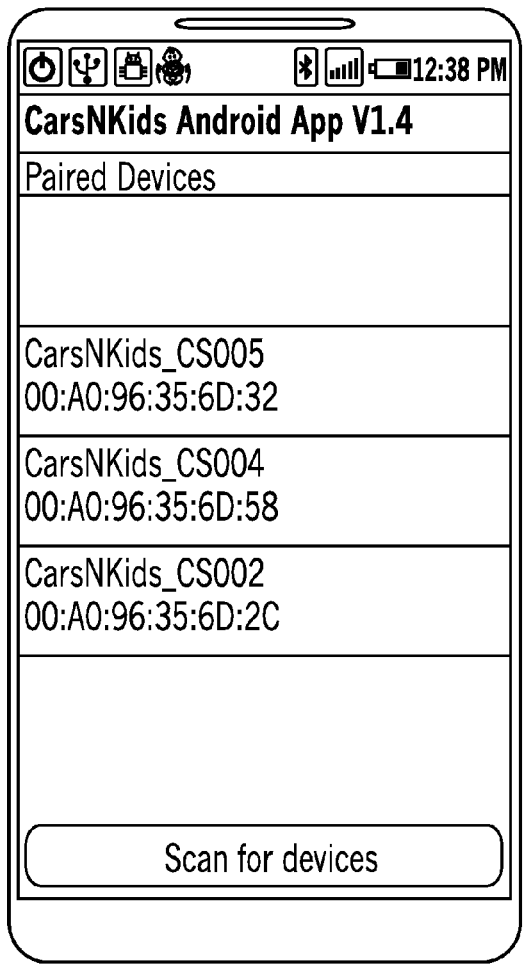
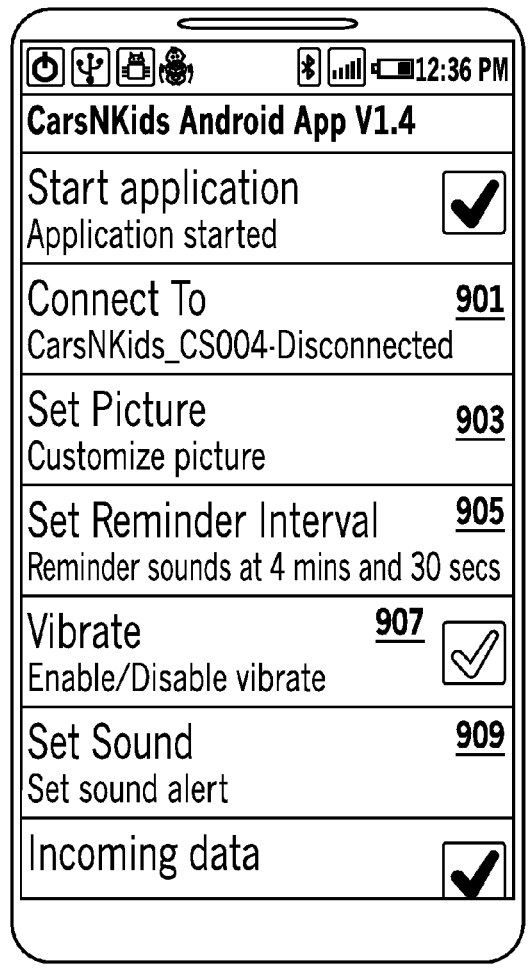
Figure 15
Figure 16A

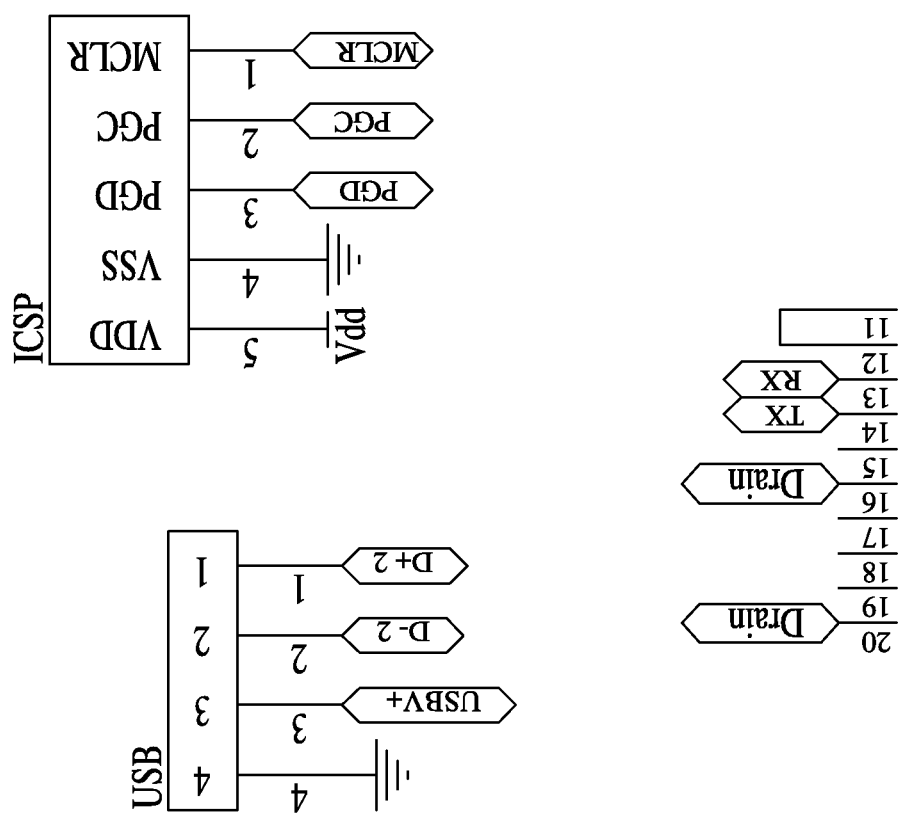

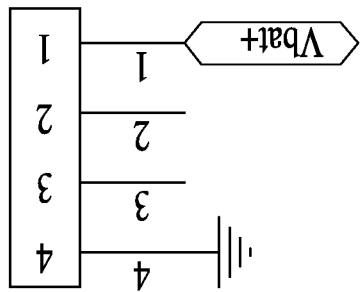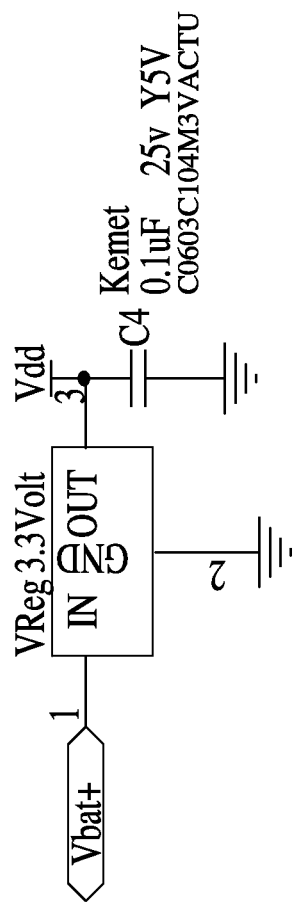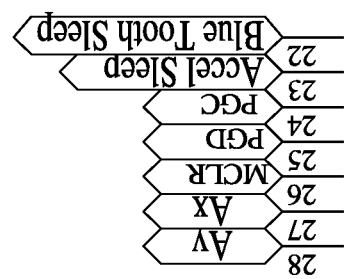
Fig. 28B

| X VALUE | Y VALUE | Z VALUE |
|---|---|---|
| 75 | 14 | 86 |

| X1 | Y1 | Z1 | X2 | Y2 | Z2 | X3 | Y3 | Z3 | X4 | Y4 | Z4 |
|---|---|---|---|---|---|---|---|---|---|---|---|
| 23 | 75 | 86 | 23 | 75 | 89 | 24 | 74 | 89 | 75 | 14 | 86 |

| $X_1/X_2$ | $Y_1/Y_2$ | $Z_1/Z_2$ | $X_2/X_3$ | $Y_2/Y_3$ | $Z_2/Z_3$ | $X_3/X_4$ | $Y_3/Y_4$ | $Z_3/Z_4$ |
|---|---|---|---|---|---|---|---|---|
| 0 | 0 | 3 | 1 | 1 | 0 | 51 | 60 | 3 |

| $X_1/X_2$ | $Y_1/Y_2$ | $Z_1/Z_2$ | $X_2/X_3$ | $Y_2/Y_3$ | $Z_2/Z_3$ | $X_3/X_4$ | $Y_3/Y_4$ | $Z_3/Z_4$ |
|---|---|---|---|---|---|---|---|---|
| F | F | T | T | T | F | T | T | F |

| $X_1/X_2$ $Y_1/Y_2$ $Z_1/Z_2$ | $X_2/X_3$ $Y_2/Y_3$ $Z_2/Z_3$ | $X_3/X_4$ $Y_3/Y_4$ $Z_3/Z_4$ |
|---|---|---|
| T | T | T |

SYSTEMS AND METHODS FOR DETERMINING IF A CHILD SAFETY SEAT IS IN A MOVING VEHICLE

CROSS REFERENCE TO RELATED APPLICATION(S)

This application is a Continuation-in-Part of U.S. Utility application Ser. No. 13/370,021, filed Feb. 9, 2012 which is a Continuation-in-Part (CIP) of U.S. Utility patent application Ser. No. 12/335,421, now U.S. Pat. No. 8,212,665 which in turn claims the benefit of U.S. Provisional Application Ser. No. 61/013,929, filed Dec. 14, 2007. Application Ser. No. 13/370,021 claims the benefit of U.S. Provisional Application Ser. No. 61/441,199, filed Feb. 9, 2011, U.S. Provisional Application Ser. No. 61/504,113, filed Jul. 1, 2011, and U.S. Provisional Application Ser. No. 61/538,647, filed Sep. 23, 2011. The entire disclosure of all of these documents is herein incorporated by reference.

BACKGROUND OF THE INVENTION

1. Field of the Invention

This disclosure relates to the field of safety devices for detection of unattended children within a vehicle.

2. Description of Related Art

Every summer there are stories on the news of children being inadvertently left in vehicles by a parent or guardian. Many of these stories have a relatively happy ending as the child is noticed by a passerby, rescued from the vehicle before suffering any adverse consequences, and the grateful parent discusses how thankful they are for others being observant. The more tragic stories result in the avoidable death of a child and generally the devastation of a family.

One thing that these stories often bring to a forefront of discussion is whether the potential danger present from a parent leaving a child in the vehicle should result in criminal charges being brought against the parent for endangering the child. As part of this, there is always significant hand-wringing over how a parent could possibly be so forgetful. Talking to many parents that have not yet left a child in a vehicle, the thought of it being accidental is simply unbelievable. Yet, when you talk to a parent that has inadvertently left a child in a vehicle (with whatever consequences) you quickly discover that up until they actually did it, they had a similar opinion.

The simple fact of life in today's world is that it is hectic and many people only get through the day operating purely on habit and routine. There is probably no greater routine breaking event than the birth of a child. Such an event will greatly change the lives of the parents in a myriad of different ways and for anybody who is forced to live a hectic schedule it is easy to see how a parent, simply acting as they did before they had the child, can inadvertently forget that the child is in the back of the vehicle at this particular time. This problem is compounded by the fact that both parents generally share child transportation duties in today's world, and often do so along a relatively random schedule. Therefore, on any given day at any given time either parent may or may not be transporting a child.

Still further, the very features designed to make automobiles safer to operate and to keep children safe in them contribute to the problem. With the addition of airbags and safer car seats, children are now generally placed in the back seat of the vehicle, instead of in the front seat where they were more easily seen by a parent departing the vehicle, particularly if the child is asleep or quiet. Further, with rear facing car seats it can often be difficult to see if the seat is occupied. This all makes it easier for a frazzled parent to forget the child is there. As the old adage goes, "out of sight, out of mind."

While new parents may not be used to thinking about having a child in the vehicle at all, parents of older children can often forget if the child is in the vehicle because the child's car seat or other indications of the child become near permanent fixtures in their vehicle, whether or not the child is present, and routines may not be greatly altered by the presence of the child. Therefore, a change in routine such as when the child is being dropped off at daycare, which parent has the child today, or even a non-standard trip where the child is brought along can result in the child being inadvertently left unattended in the vehicle.

Beyond the child being inadvertently left in the vehicle by a parent, children are also inquisitive and an older child may get into a parked vehicle without a parent knowing. This situation can be just as dangerous as leaving an unattended child in the vehicle, but may be much harder for a parent to detect since the parent was not involved in the child getting into the vehicle originally.

SUMMARY OF THE INVENTION

For these and other reasons there are described herein systems and methods which are designed to provide an alarm or other reminder that a child is likely present in a parked or more specifically, non-moving, vehicle. These can range from subtle audio reminders designed to remind a parent as they are parking a vehicle that the child is present, to blaring audio and visual reminders to try and trigger the attention of passers-by to remote communication systems designed to locate necessary assistance, to systems designed to detect that a child has gotten into an unattended vehicle.

Described herein are a number of embodiments of child vehicle seat safety systems and associated methods that use sensors to determine if a child is in a vehicle unattended or attended, in their seat or not, and if the vehicle is moving or not.

There is described herein, among other things, a method for determining if a vehicle is in motion, the method comprising: providing a three-dimensional accelerometer placed in a vehicle and a processor for processing the output of such accelerometer; measuring the output of all three dimensions of said accelerometer in a specified time period; averaging said output for each of said three dimensions in said specified time period to provide a cluster; creating an array of said clusters having a fixed length; comparing consecutive clusters in said array to determine if there is a change in any dimension; if there is a change in any dimension: determining a magnitude of that change and comparing the magnitude against a fixed value; if there is both a change in said dimension and said magnitude of said change is above said fixed value, increasing a tally; otherwise, decreasing said tally; and using said tally to determine if said vehicle is in motion.

There is also described herein, a non-transitory computer readable media including computer readable instructions for: measuring the output of all three dimensions of a three-dimensional accelerometer in a specified time period; averaging said output for each of said three dimensions in said specified time period to provide a cluster; creating an array of said clusters having a fixed length; comparing consecutive clusters in said array to determine if there is a change in any dimension; if there is a change in any dimension: determining a magnitude of that change and comparing the magnitude against a fixed value; if there is both a change in said dimension and said magnitude of said change is above said fixed value, increasing a tally; otherwise, decreasing said tally; and using said tally to determine if said vehicle is in motion.

BRIEF DESCRIPTION OF THE DRAWINGS

FIGS. 5A, 5B, 5C, 5D, 5E, and 5F are a functional electronic diagram of various processors and components from an embodiment of electronics.

FIGS. 11-15, 16A-16C, and 17-22 provide embodiments of screenshots from a smartphone showing various displays and controls of an embodiment of the child seat safety system.

FIGS. 27A-27F provide a schematic of an embodiment of components of a car seat system.

FIGS. 28A-28F provide a schematic of another embodiment of components of a car seat system.

FIGS. 30A-30H show embodiments or various arrays of values which can be used in determining if a three-dimensional accelerometer is detecting vehicle motion.

DESCRIPTION OF THE PREFERRED EMBODIMENT(S)

Figure 1:
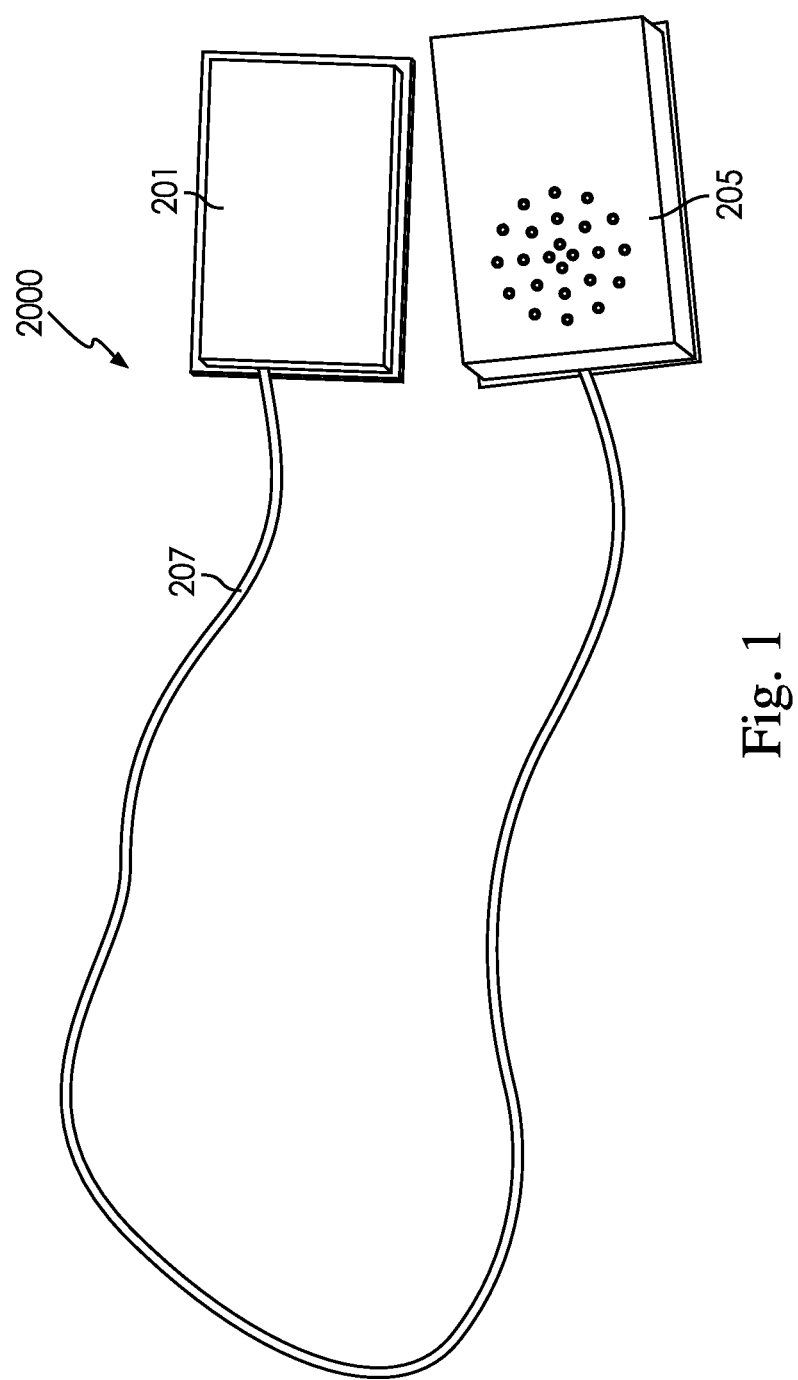
FIG. 1 is a top down view of a first embodiment of a notification system designed to be positioned in a child safety seat.

Generally the notification systems (200) and methods discussed herein include four major components which may be arranged in a variety of configurations. Generally the systems (200) will be configured to include a car seat portion or monitor (2000) which is intended to be used as a part of or in conjunction with a car seat. The monitor (2000) may comprise all the major components in an integrated system (such as in the embodiment of FIG. 1) or may comprise a portion of the system (200) designed to work with components of the vehicle (105) or external devices such as a smartphone (215) (as in the embodiment of FIGS. 23A and 23B).

Regardless of whether components are in the monitor (2000) or not, the system will generally comprise an alarm or reminder system (211) which serves as the indicator to determine if an unattended child (101) is present or to act as a reminder that a child (101) may be present and needs to be attended to. In some embodiments, this alarm (211) is part of the monitor (2000) while in others the monitor (2000) utilizes external systems (such as those of a vehicle (105) or a smartphone (215)) to provide the alarm.

The systems and methods also generally include a child detector (201), which serves to determine if there is an increased likelihood of a child (101) being present in a car seat (100) or in the vehicle (105) and, therefore, it is appropriate to trigger the alarm (211) should the vehicle (105) be parked. The child detector (201) will generally be part of the monitor (2000) and operate directly on the seat (100), seat cushion, or seat cover, but in alternative embodiments could be a system attached directly to or part of the vehicle (105).

The systems and methods also include a detection apparatus or motion sensor (221) whose purpose is to determine if the vehicle (105) is in operation. Generally, these sensors (221) are used to determine if the vehicle (105) is in motion, being physically displaced, or "not parked." In a preferred embodiment, the motion sensor (221) comprises an accelerometer which is attached directly to the seat (100), but in alternative embodiments, systems, such as vehicle wheel rolling detectors, can serve the purpose.

Finally, the system (200) and methods will generally include a computer processor (microprocessor) or similar controller (231) which serves to coordinate and control the various other components and operate the system (200). The controller (231) will generally be headquartered in the monitor (2000) so as to place control for the system (200) on-board the seat (100) and avoid the need to reprogram the vehicle (105) to control the system (200). However in an alternative embodiment the controller (231) may be part of the vehicle (215) or external to the vehicle (105).

A major problem with prior child detection systems is that they require the vehicle operator to manually arm them or make sure they are switched on when they begin use of the vehicle (105) because otherwise the system (200) could indicate alerts when the vehicle (105) was simply driving down the road or could be constantly triggering even if the child (101) was not in a car seat (100). The problem with any such system is that it is just as easy to forget to arm the system when the child (101) is using the seat (100), as it is to leave the unattended child (101) in the vehicle (105). For this reason, the system (200) discussed herein will preferably be armed by placement of the child (101) in the car seat (100) and/or by placement of the seat (100) in a vehicle (105). In this way, when the child (101) is in the vehicle (105) the system (200) is automatically armed.

Figure 2:
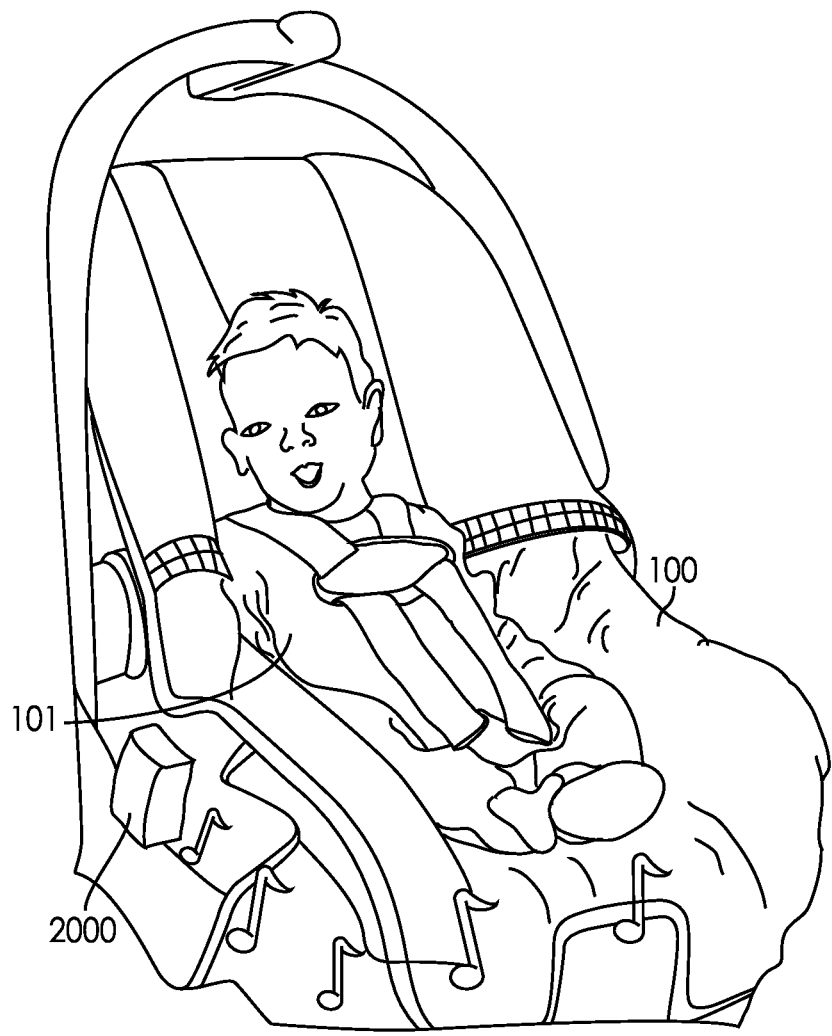
FIG. 2 illustrates a child's vehicle safety seat including an embodiment of the notification system which is in place.
Figure 3:
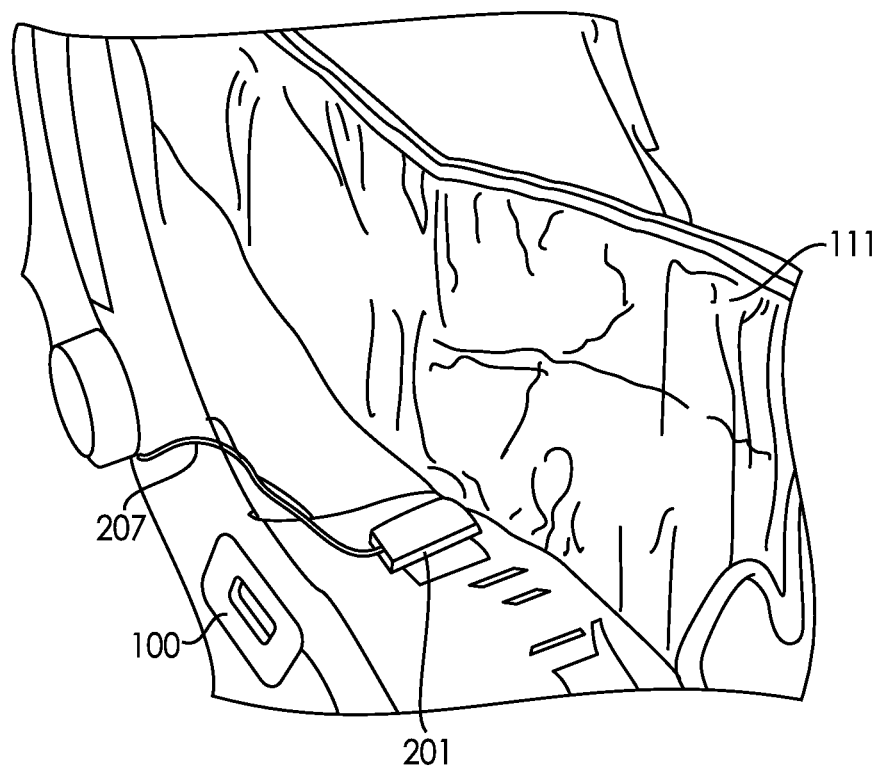
FIG. 3 illustrates the child's vehicle safety seat of FIG. 2 with the cushion raised to show positioning of the pressure sensitive pad.
Figure 4:
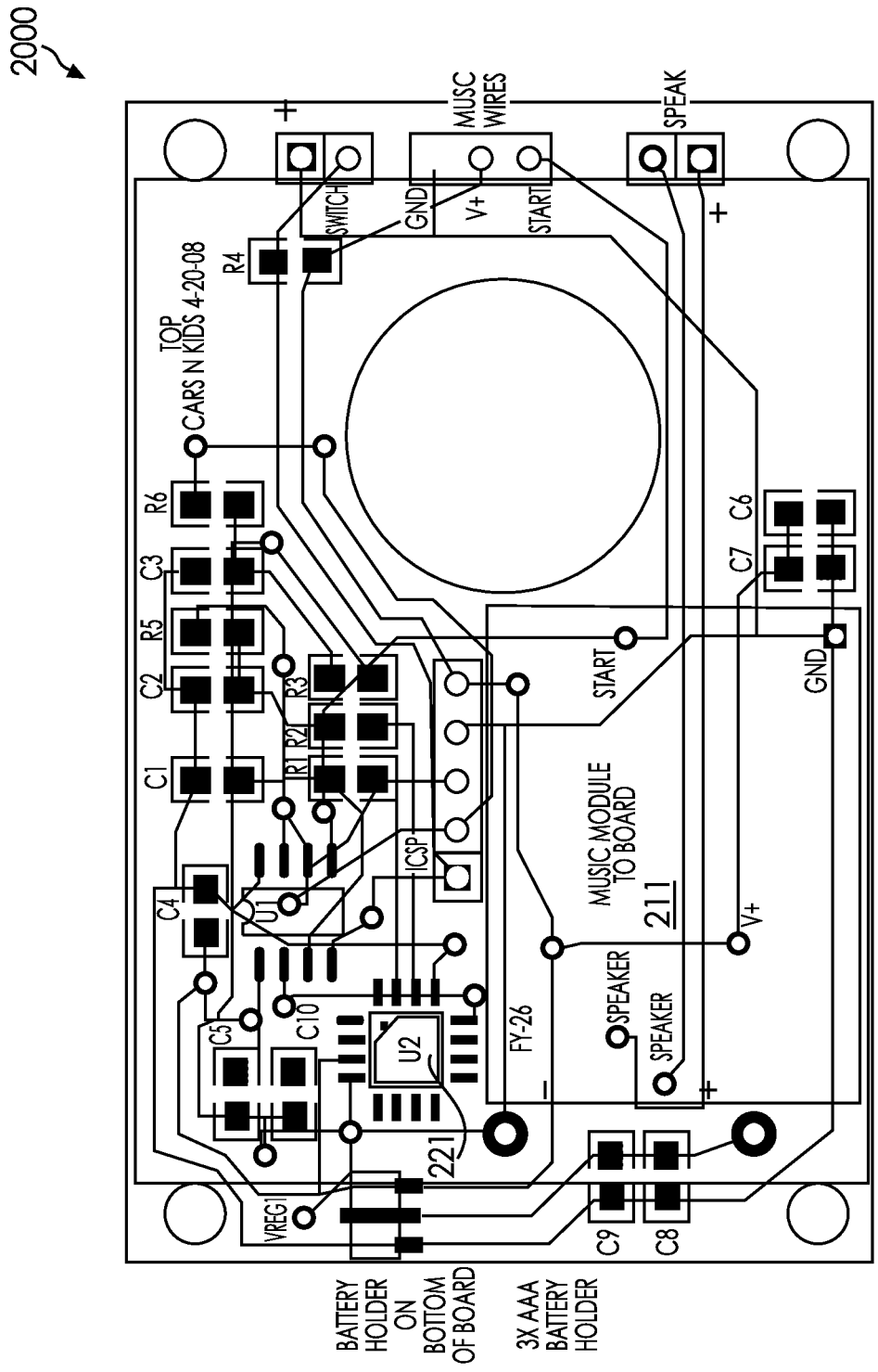
FIG. 4 is a circuit diagram showing an embodiment of a circuit board laying on an embodiment of a notification system.
Figure 5A:
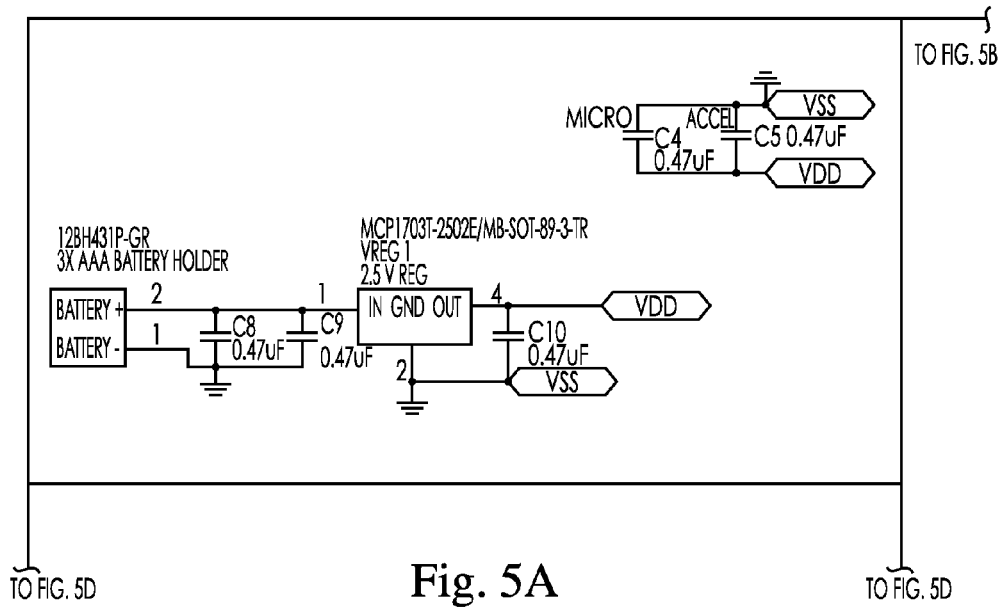
Figure 5B:
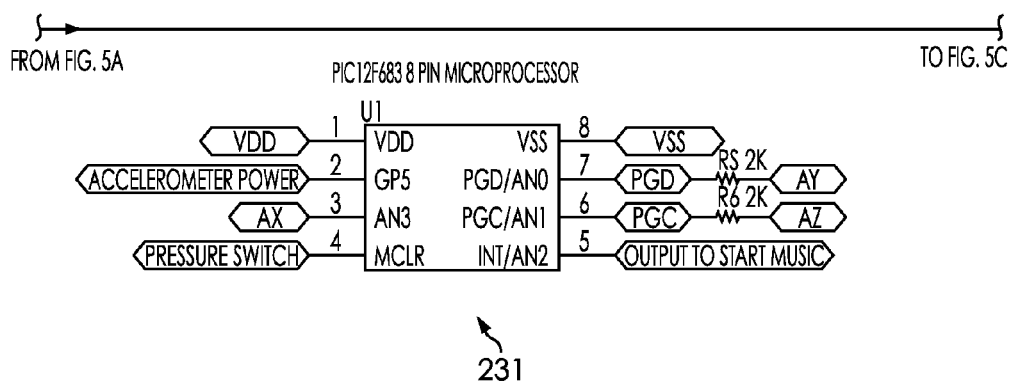
Figure 5C:
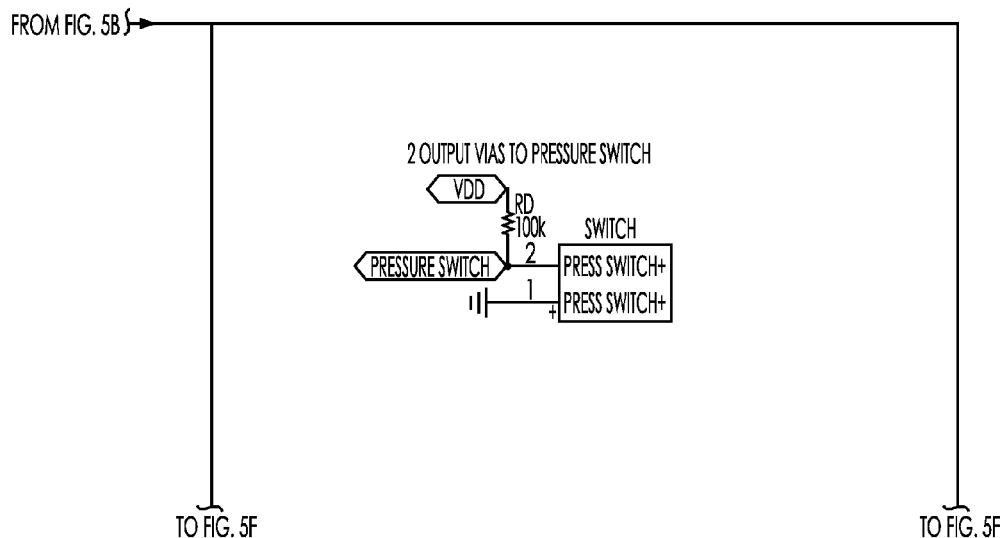
Figure 5D:
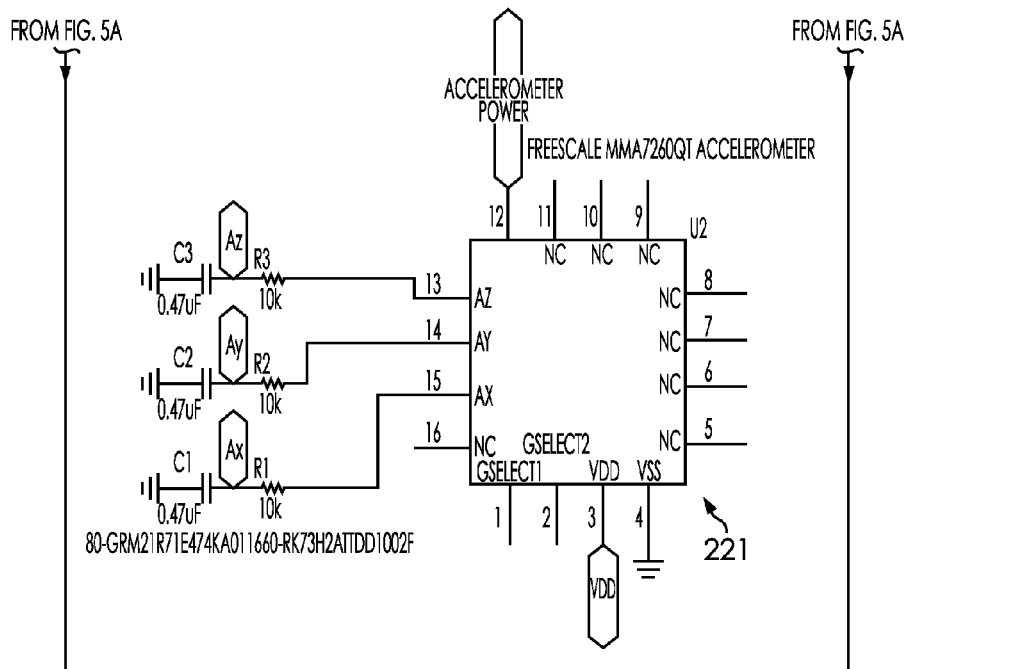

As shown if FIGS. 2, 3 and 28, systems (200) and methods discussed herein are generally designed to operate in conjunction with the use of a child seat (100) in conjunction with a vehicle (105). This child seat (100) may be of any type, and for any aged child (101), and may be forward facing, rearward facing, convertible, or a booster seat. The monitor (2000) may be used with car seats (100) which are designed to be left in the vehicle (105) with the child (101) getting out of the seat (100) to leave the vehicle (105), may be used with car seats (100) which are removed with the child (101) when the child (101) leaves the vehicle (105), or may be used with car seats (100) which utilize a car adapter where a portion of the car seat (100) is removed with the child (101), but a connector or similar structure is designed to remain in the vehicle (105).

While it will generally be the case that the monitor (2000) will be used on or in conjunction with a child car seat (100), it is by no means required and the systems (200) and devices can operate without need of such a car seat (100). However, children who are generally old enough to not need any form of car seat (100), are also generally old enough to call for help and/or to extract themselves from the vehicle (105) should they be left behind or unattended. Children (101) in safety seats (100) are much more dependent on their parents as they are less likely to speak out or indicate that they are about to be forgotten. They are often asleep, and they generally cannot reach or operate the car doors to exit the vehicle (105) themselves. Even if they can, they may not be aware that remaining alone in the vehicle (105) is dangerous. In an alternative embodiment, the car seat (100) is eliminated as the monitor (2000) can be used to detect a pet, child, or other actor that is laying on or otherwise sitting in a seat, in the storage area, or in a confined carrier placed in the vehicle (105).

A first embodiment of a notification device is shown in FIG. 1. This monitor (2000) is generally preferred for use in a forward facing toddler type seat (100) or a booster seat such as for an older child. The monitor (2000) depicted in FIG. 1 is also designed to be retrofitted to a car seat (100) or otherwise attached to a seat as a separate component. In an alternative embodiment, the device (200) can be built into the structure of a seat (100) so as to be an integral part. With most such seats (100), the seat (100) will remain in the vehicle (105) when the child (101) leaves the vehicle (105) and therefore the monitor (2000) will also remain in the vehicle (105). For this reason, the device's (2000) arming system will generally not be able to be manually disabled as possible annoyance from it going off when the seat (100) is in a public place or where it may distract others as such an action is very unlikely since the seat (100) is left in the vehicle (105).

Figure 23A:
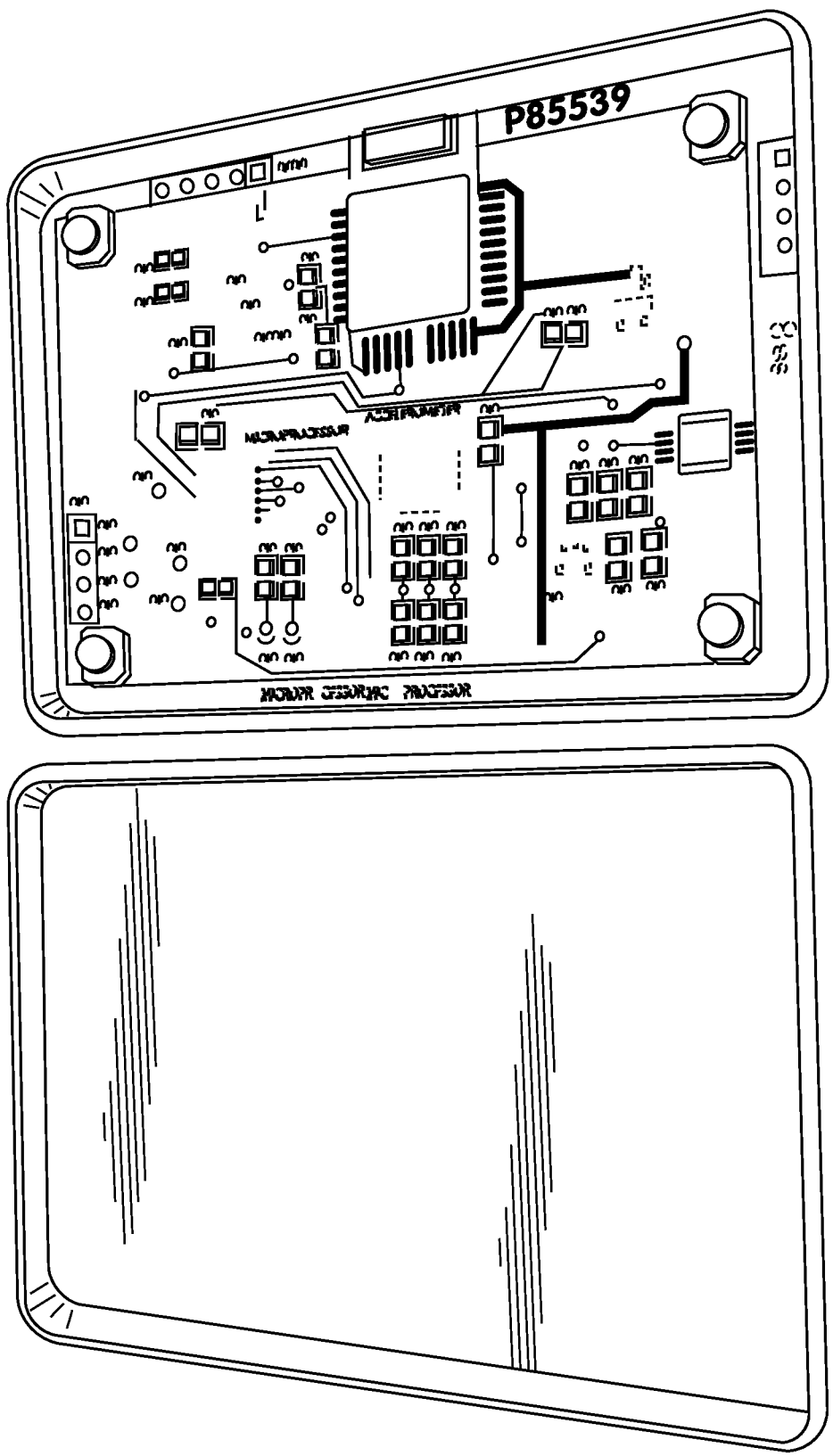
FIG. 23A provides a photograph of an integrated car seat device including the car seat components, and a single housing incorporating all elements. This device can be placed under the seat in a car seat and can detect the child, vehicle motion, and provide communication and control with an external alarm receiver.
Figure 23B:
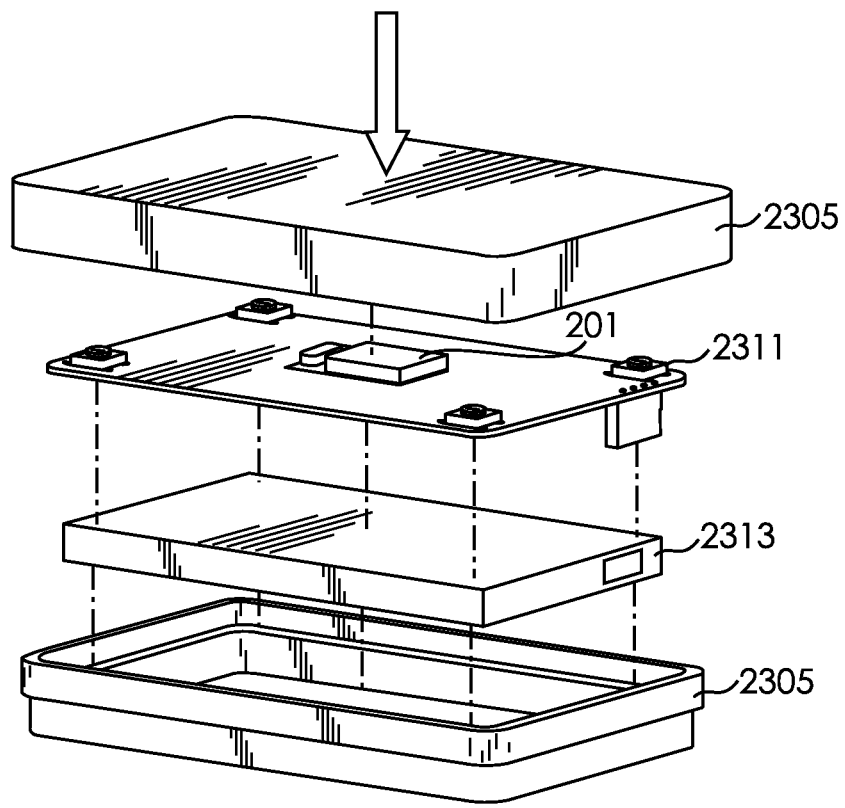
FIG. 23B provides a drawing of an exploded view of the integrated car seat device of FIG. 23A.
Figure 24:
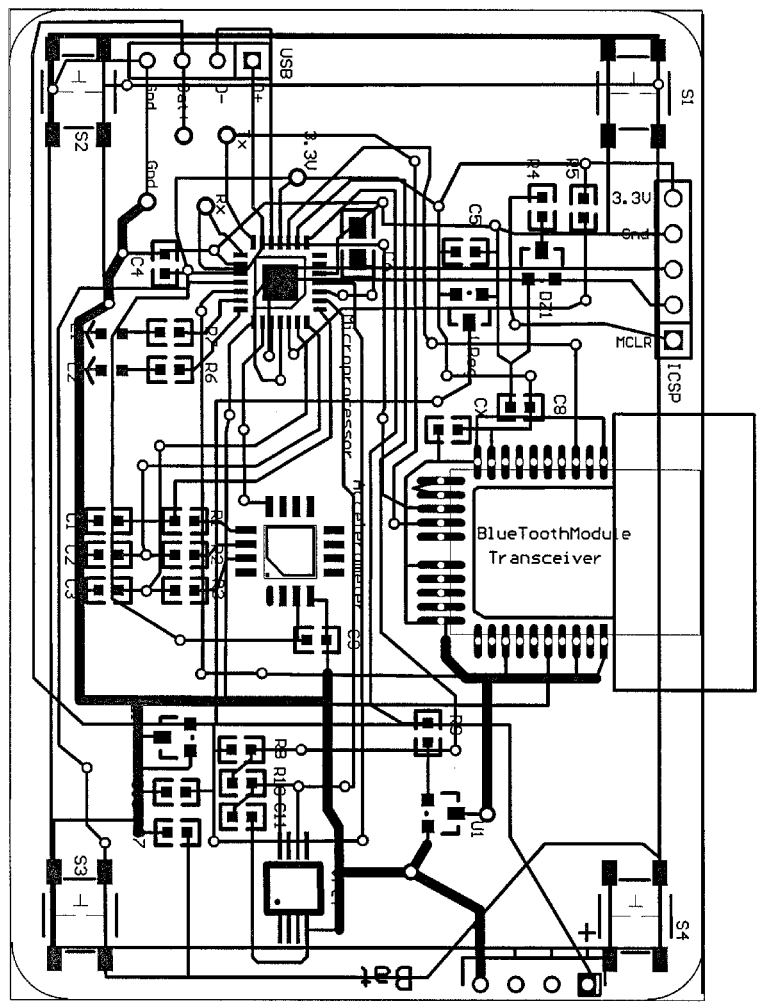
FIG. 24 provides a circuit diagram of an embodiment of the in car seat integrated device components showing the combined top and bottom layer.
Figure 25:
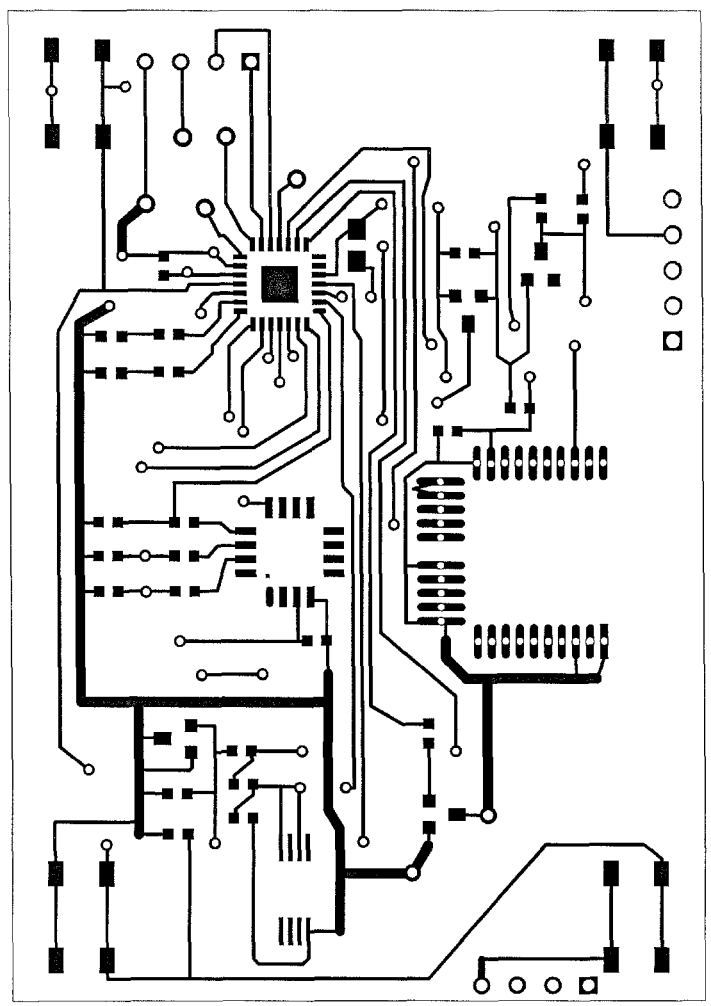
FIG. 25 provides a circuit diagram of the embodiment of FIG. 24 showing the top layer.
Figure 26:
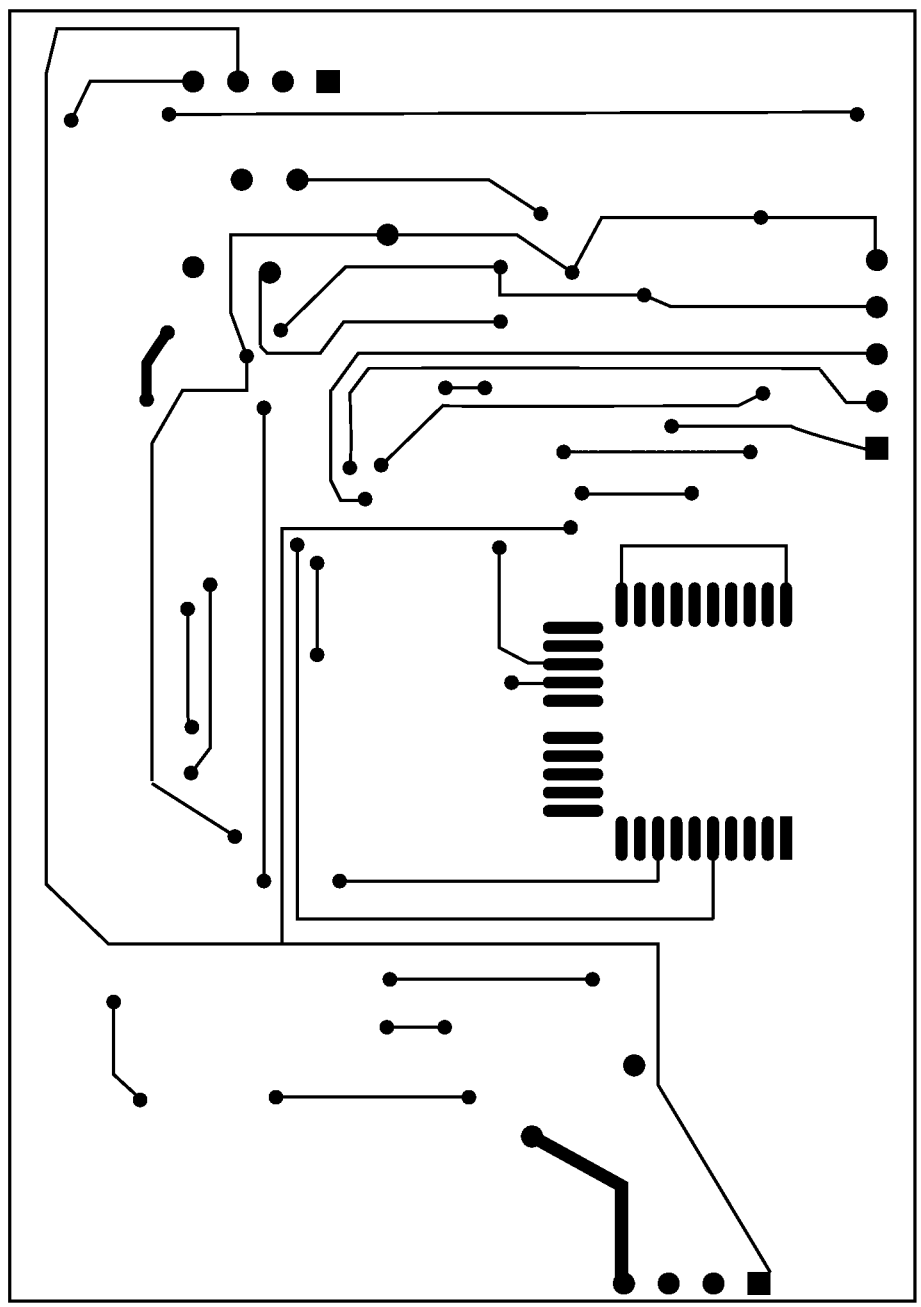
FIG. 26 provides a circuit diagram of the embodiment of FIG. 24 showing the bottom layer.
Figure 27A:
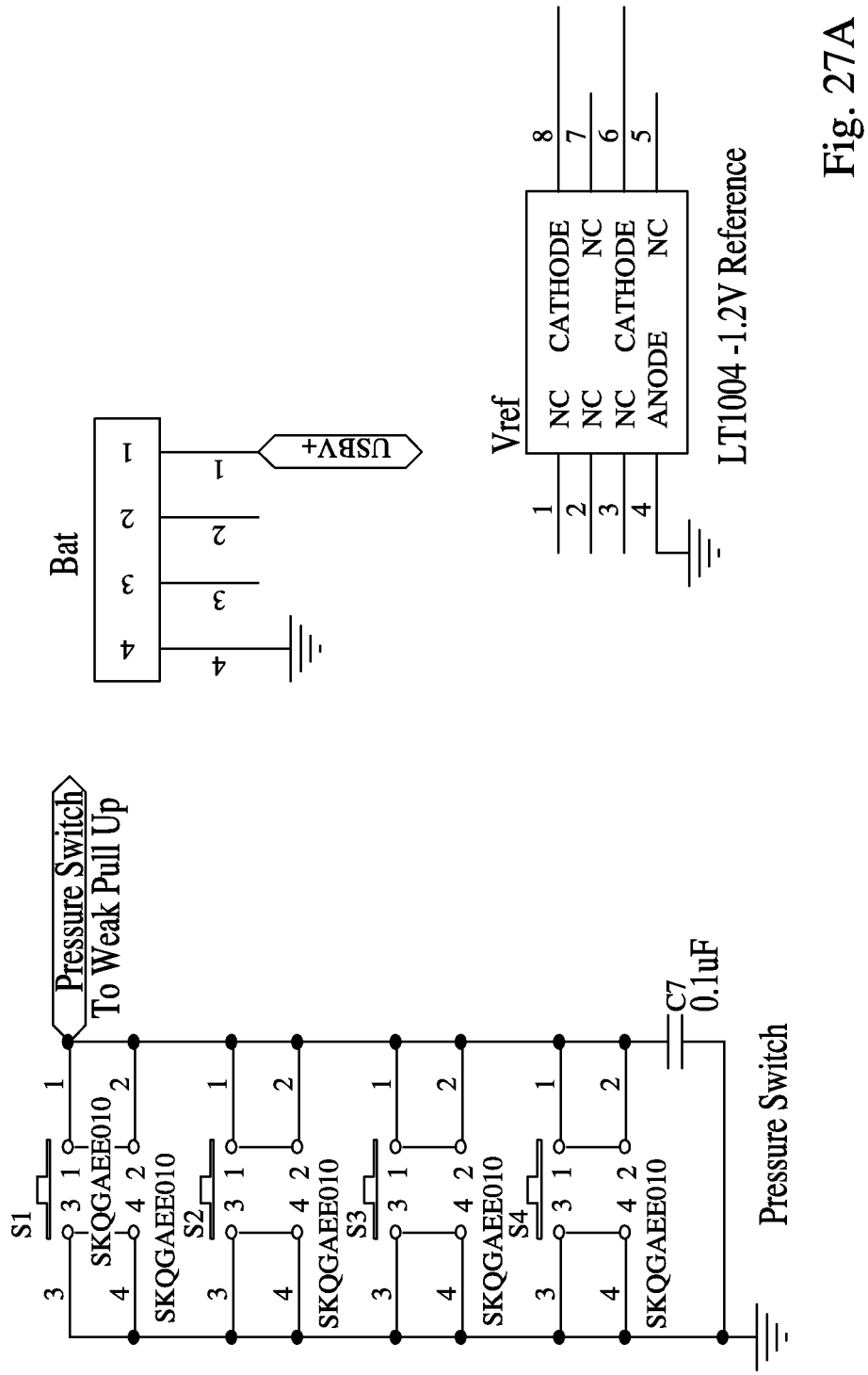
Figure 27B:
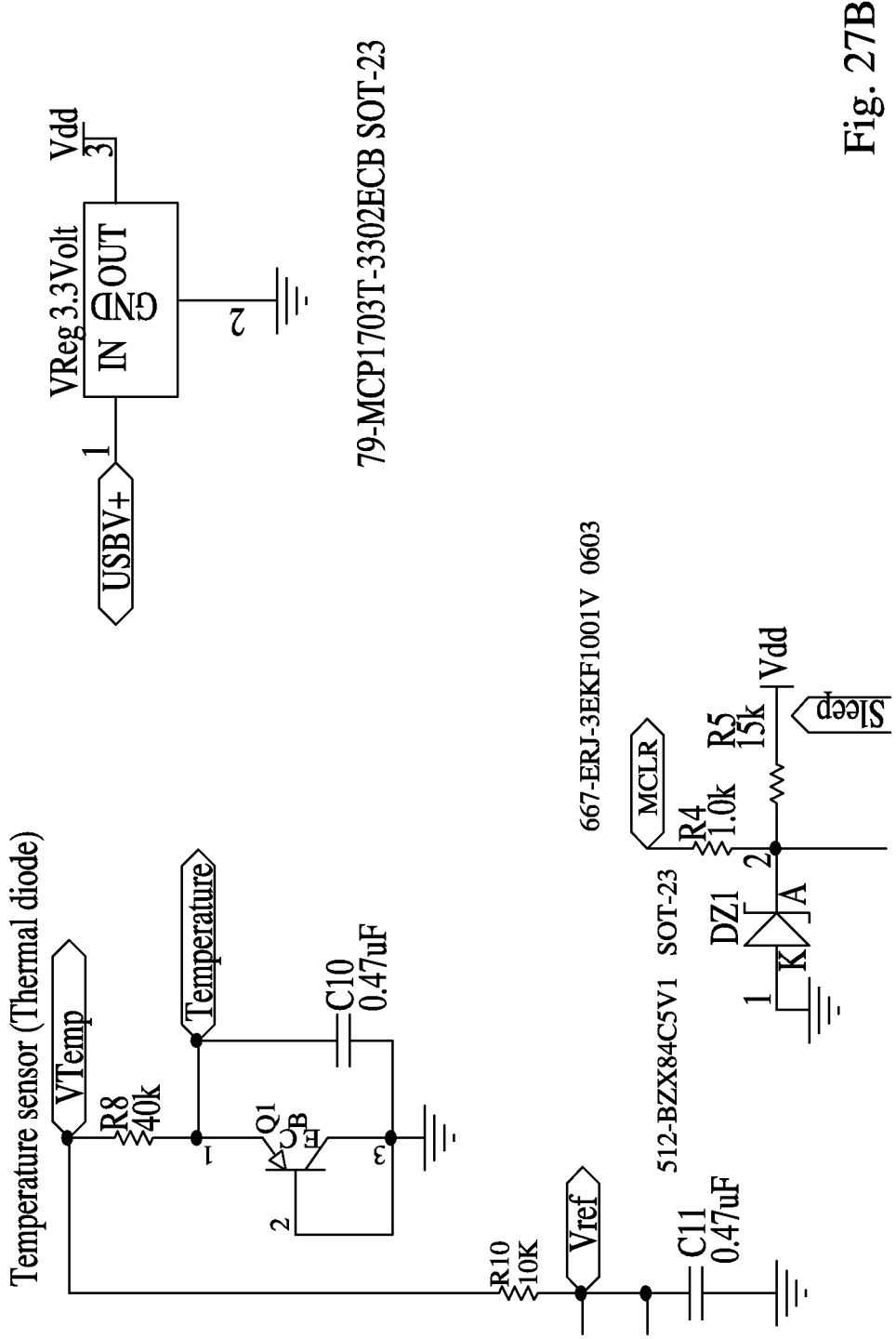
Figure 27D:
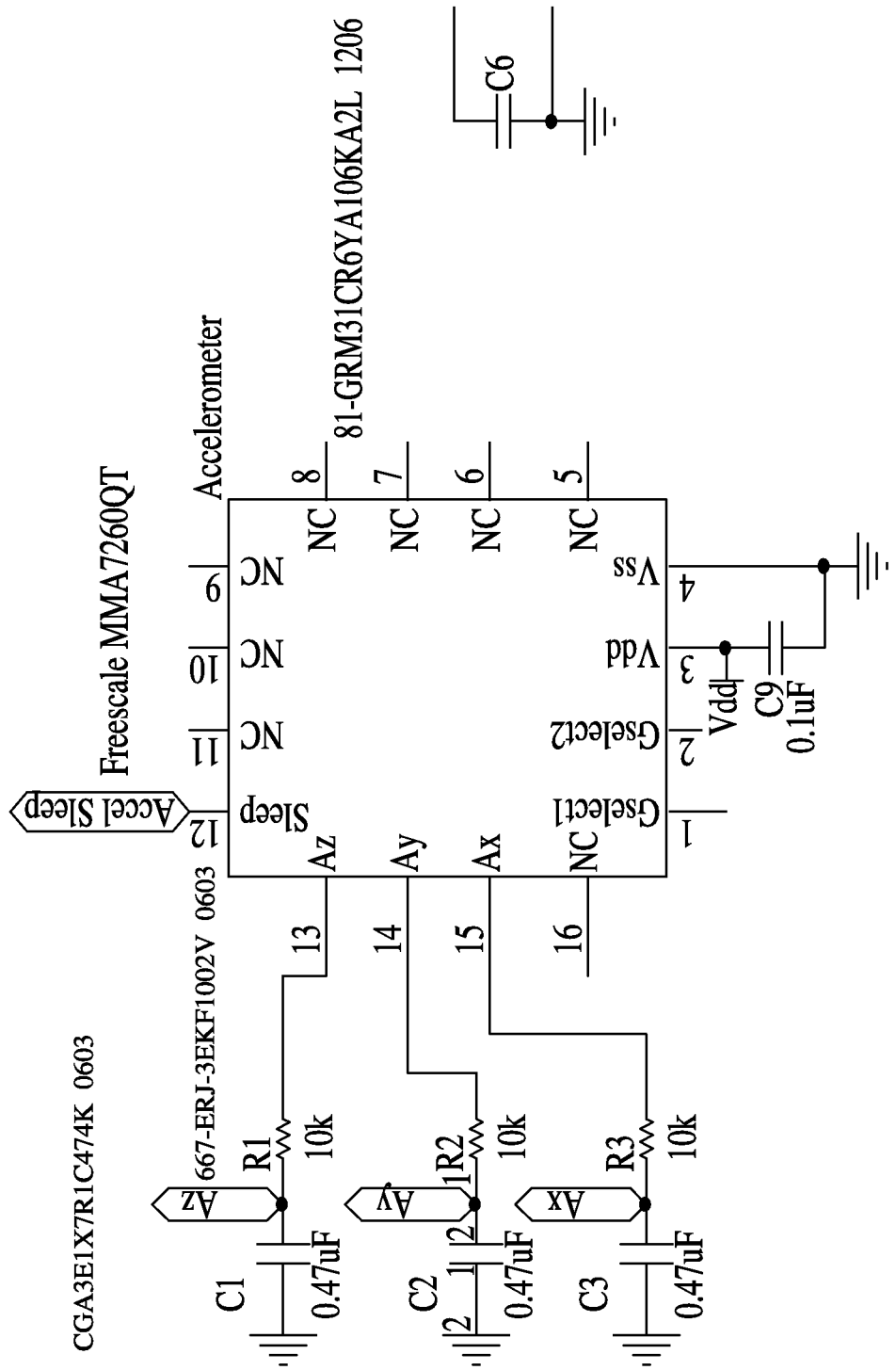
Figure 27E:
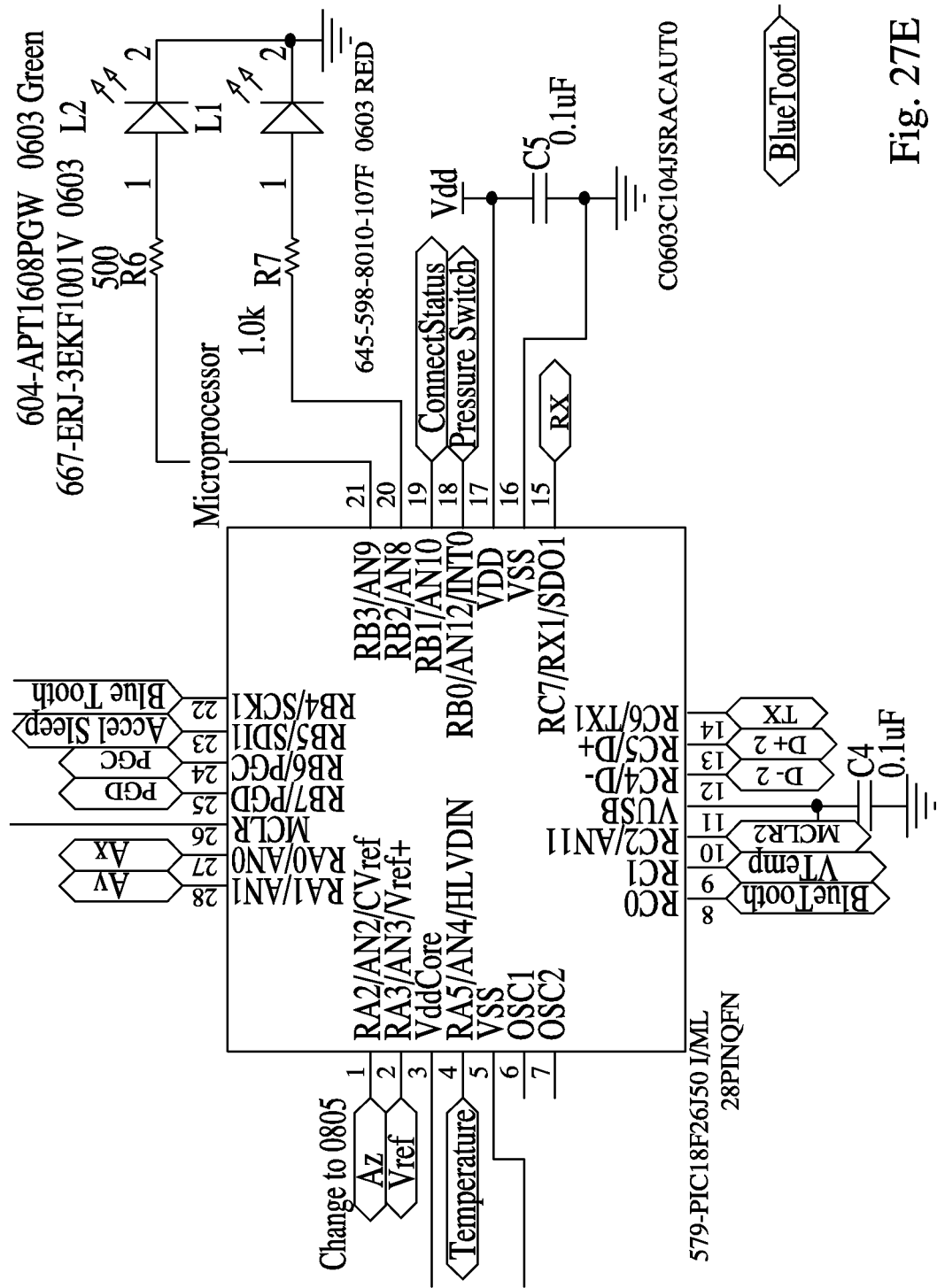
Figure 27F:
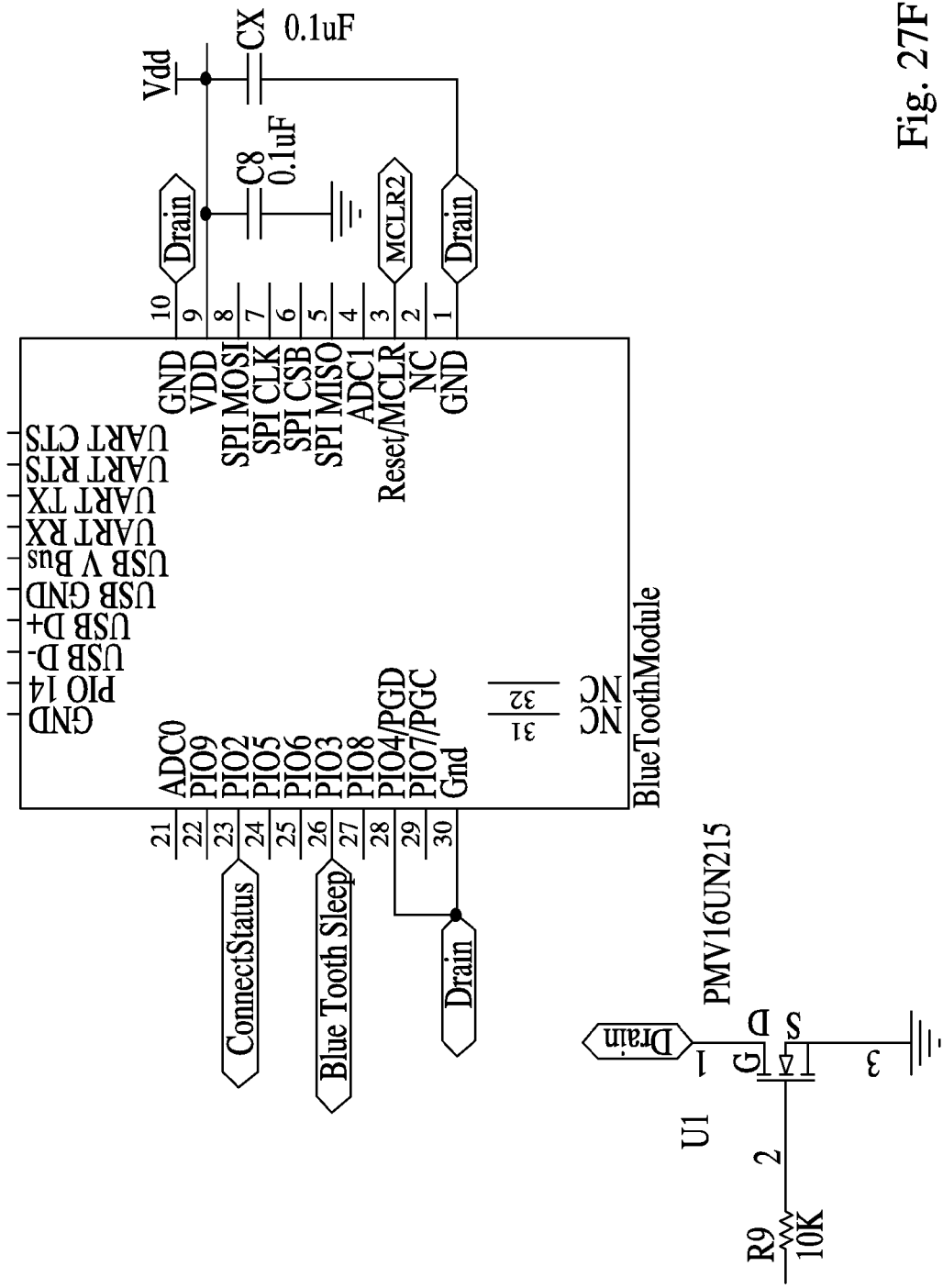
Figure 28A:
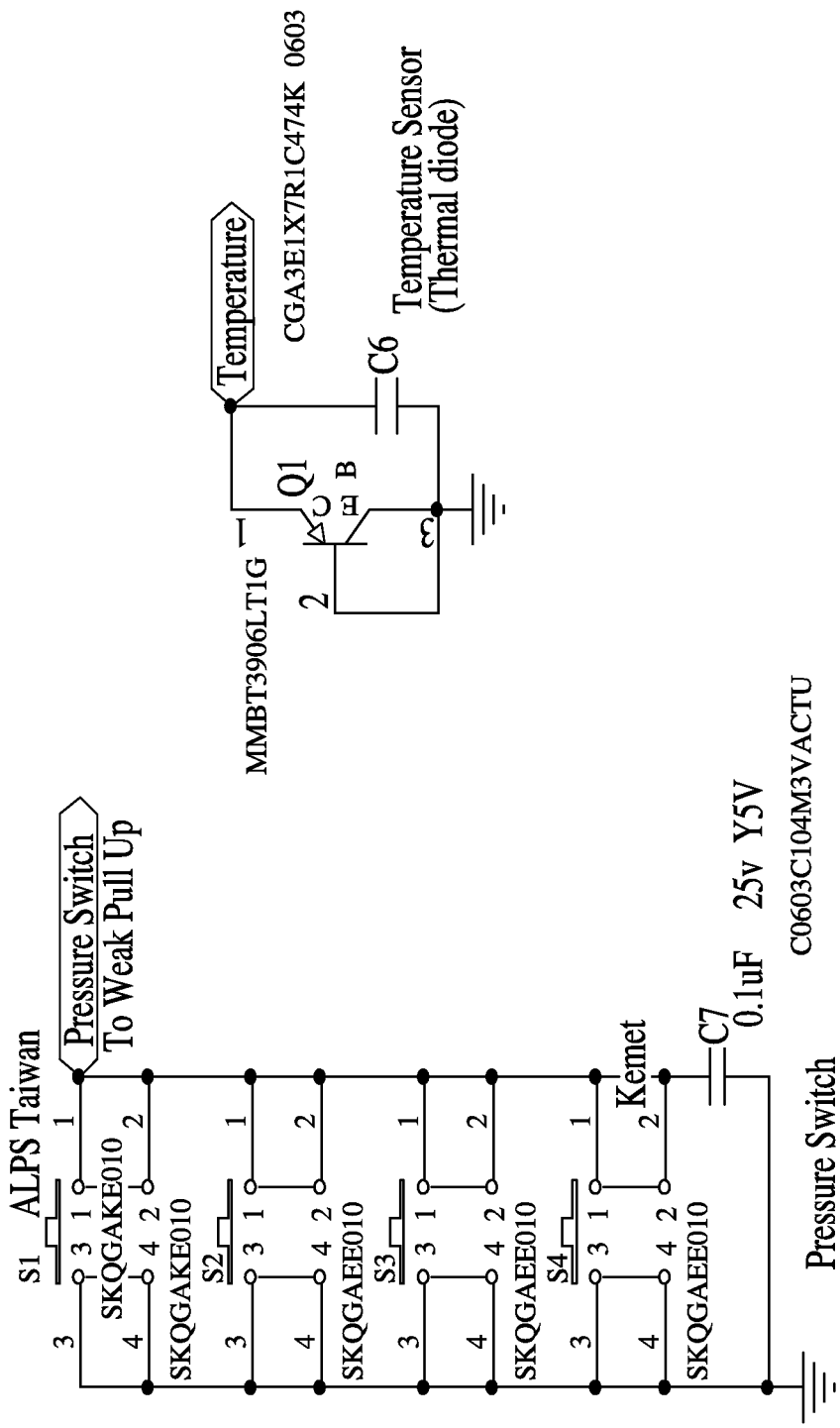
Figure 28C:
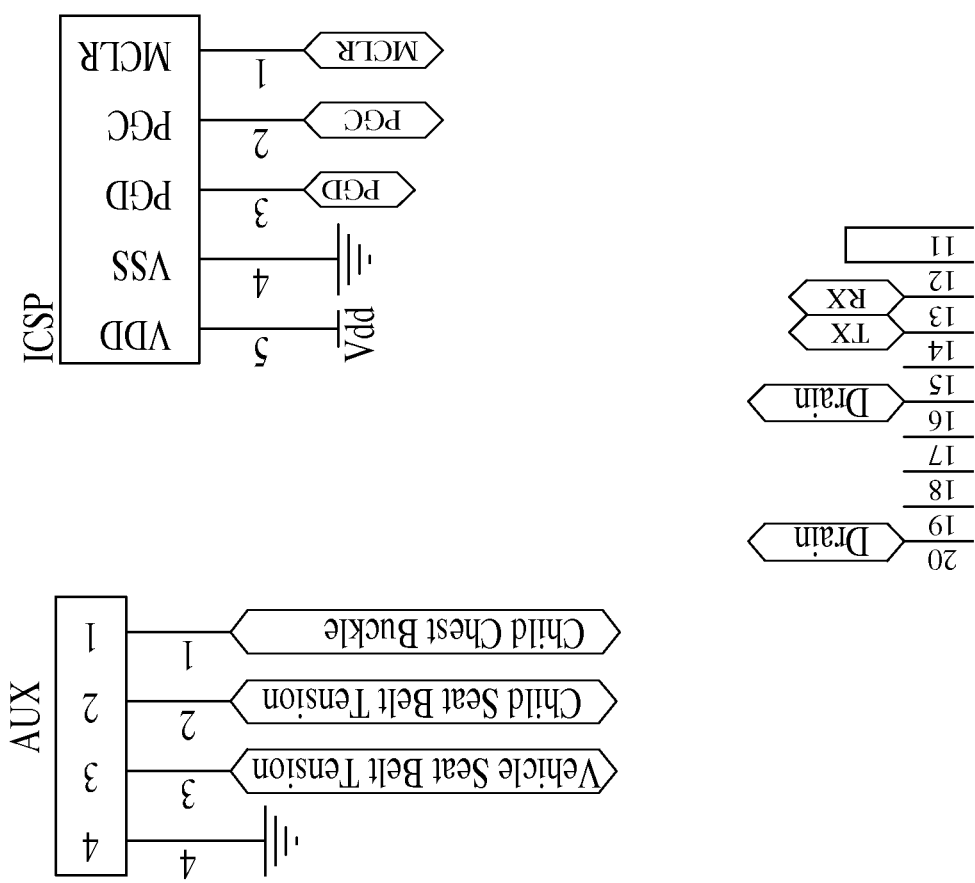
Figure 28D:
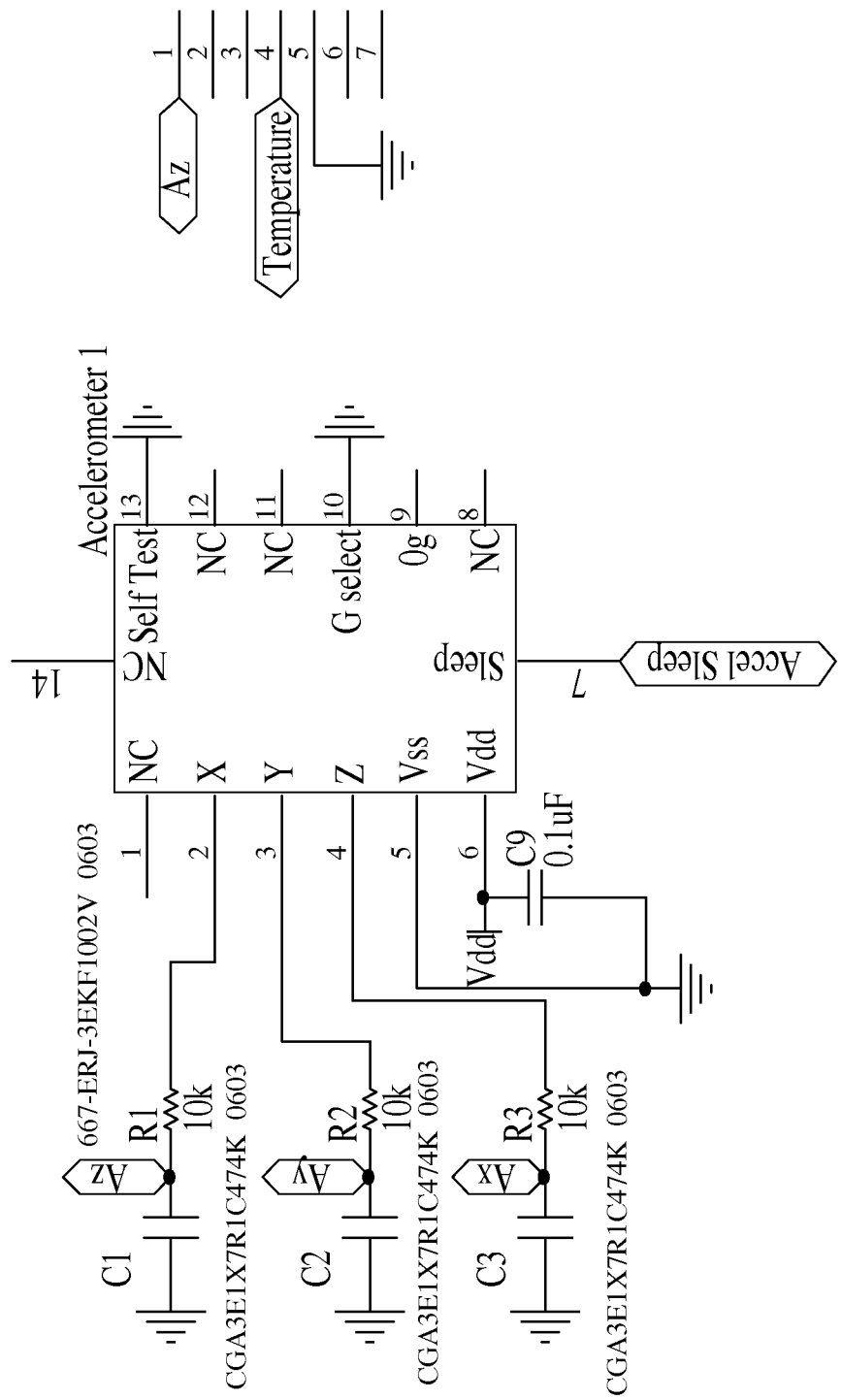
Figure 28E:
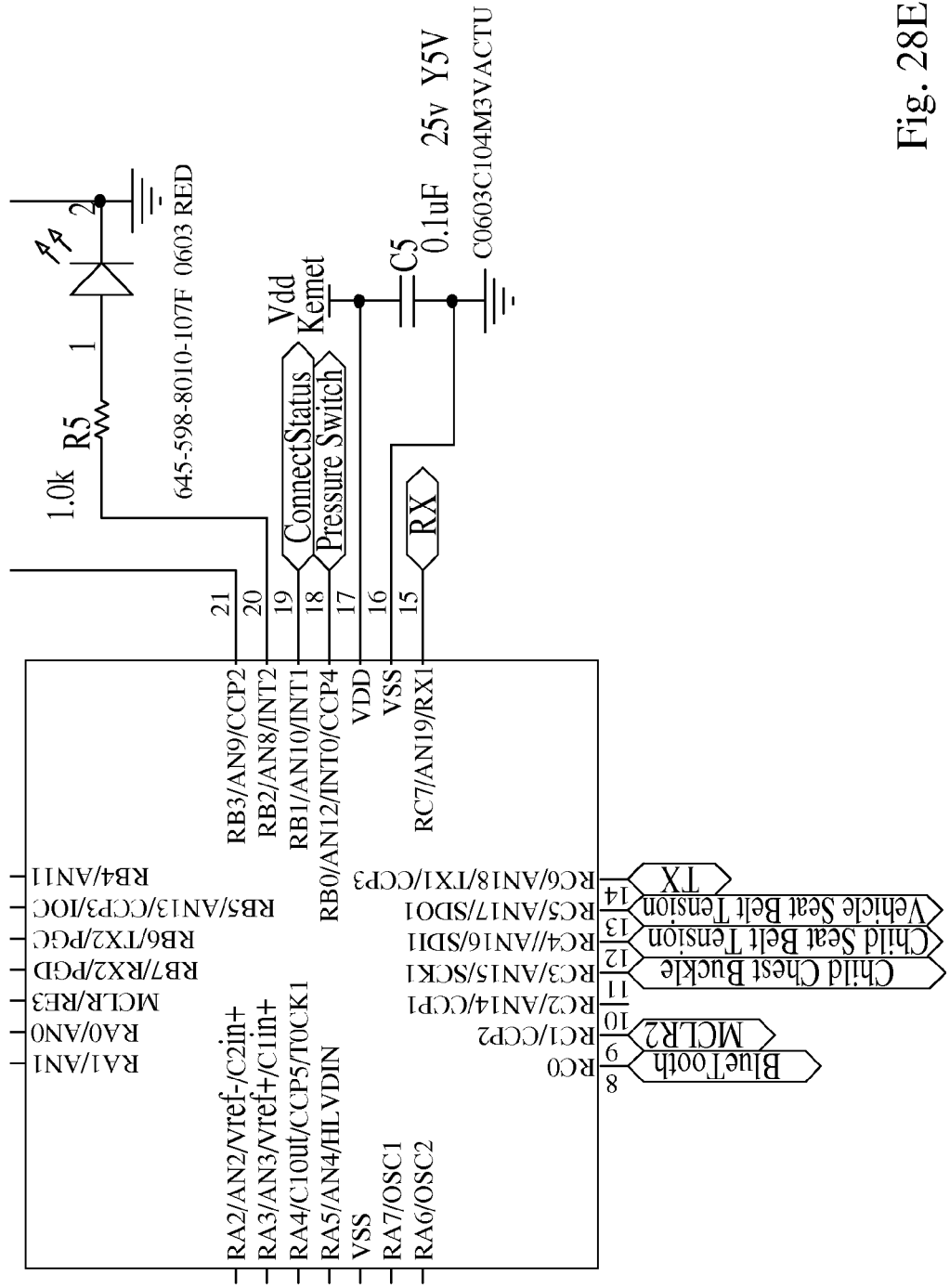
Figure 28F:
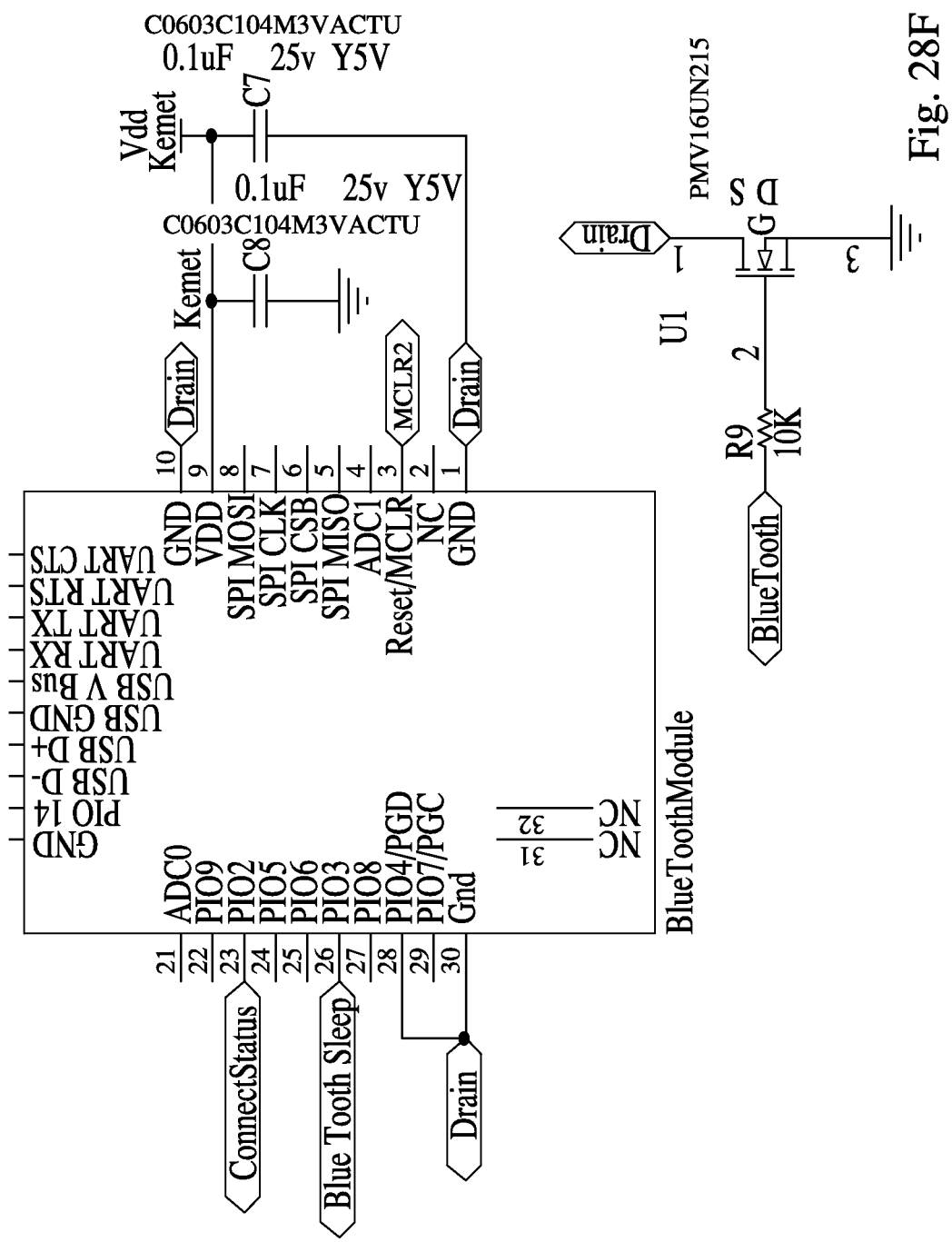

FIGS. 23A and 23B provides an alternative embodiment of monitor (2000) to FIG. 1 where the components including the circuit board (2311) and battery (2313) are integrated into a single package to eliminate wires. The monitor (2000) of FIGS. 23A and 23B, however, will also generally interface with a remote system, such as the vehicle (105) or a smart-phone (215) using a communication protocol such as, but not limited to, Bluetooth™, Radio Frequency, Infrared, cellular, PCS, ASK, OOK, GPRS, GSM, WiFi, or other systems now known or later discovered. The monitor (2000) of FIGS. 23A and 23B is also designed to institute control by including a wireless communication system (235) as part of the alert process.

Figure 6:
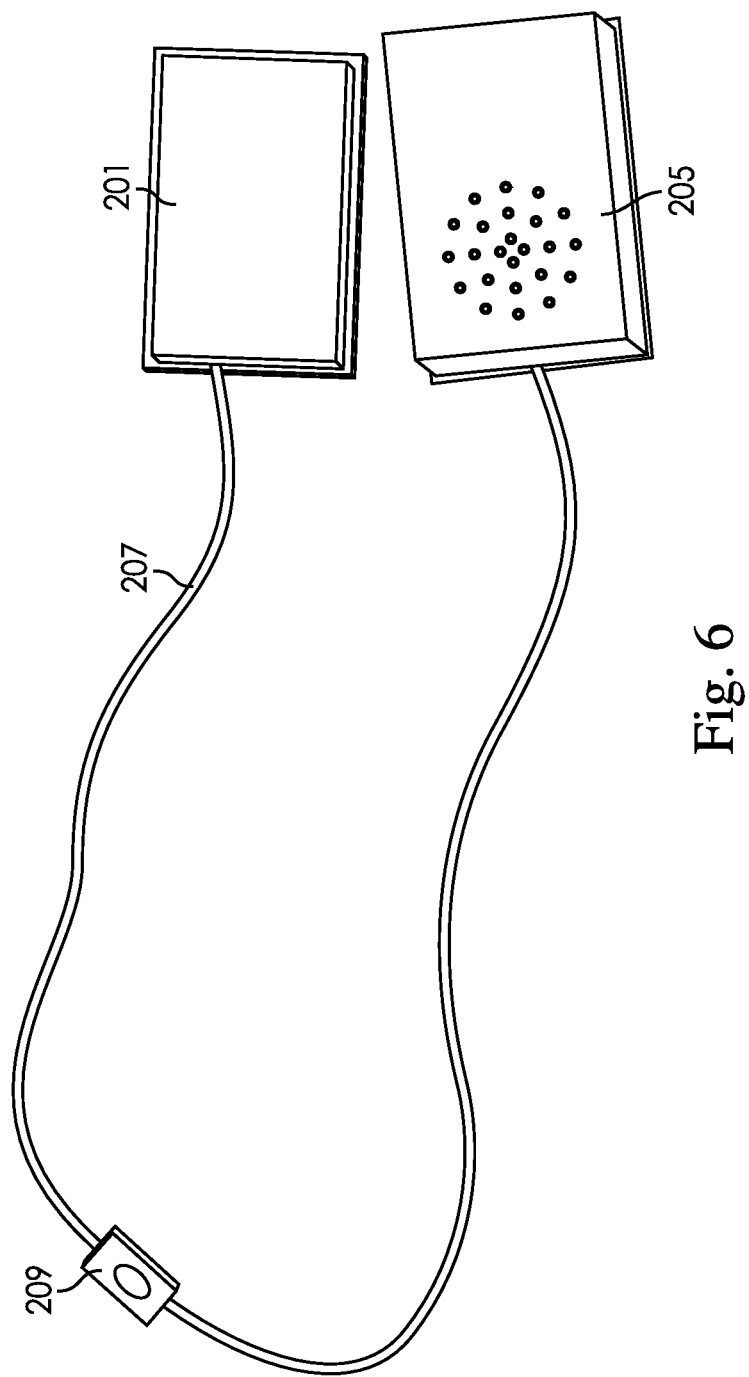
FIG. 6 provides a top down view of another embodiment of a notification system including a manual disarm.

The embodiment of FIG. 6 provides for another alternative embodiment to that of FIG. 1 which allows for a manual and temporary disarming of the monitor (2000). However, other than this additional feature of FIG. 6, the various devices (2000) generally operate in a similar fashion and similar components of their operation will be discussed together. FIGS. 5A-5F along with FIGS. 24, 25, 26, 27, and 28 provide various circuit diagrams and schematics showing component layouts for such embodiments as these to provide for additional detail and understanding.

As shown in FIG. 2, there is provided a car safety seat (100) into which the child (101) will be placed and appropriately secured. The seat (100) includes a monitor (2000) which is designed to trigger a notification should the child (101) be in the seat (100) and the vehicle (105) be parked. In the embodiment of FIG. 1, the monitor (2000) generally comprises two parts which are connected together by a wire. First is a device for detecting (201) the child (101) if a child (101) is in the seat (100). There is also a master housing (205) which includes other electronics. As discussed above, in the embodiment at FIGS. 23A and 23B a single housing (2305) is used to house all components together. The housing (203) or (2305) will be placed with the seat (100) and generally includes a motion sensor (221) or similar means for determining if the vehicle (105) is in motion, a processor (231), and associated control electronics, or similar means for operating the system (200), as well as alarm and/or notification apparatus (211) or similar means and/or a wireless communication device (235) or similar means.

In a preferred embodiment, the motion sensor (221) comprises a motion detector, such as an accelerometer, which can temporarily disable the notification (211) if the seat (101) is currently in motion. It should be recognized, however, that the functions of any of these components may be removed from the housing (203) or (2305) in alternative embodiments.

The system and methods are generally designed to provide for two different situations. If the seat (100) is likely occupied by a child (101) and the vehicle (105) is not currently in motion, the systems and methods are designed to initiate a notification sequence which will result in an alarm situation. Otherwise, the system (200) will generally sleep and not trigger an alarm unless it is being used to monitor other statuses, such as if the child has gotten out of the seat. In this way, the alarm will not be triggered if either, the car seat (100) is unoccupied (unless it detects that a child has left the seat while the vehicle is in motion), or the vehicle (105) is in operation and therefore the parent is likely present and also in the vehicle (105). In an alternative embodiment, the system (200) can also detect that a child (101) has left the seat (100) while the vehicle is in motion.

Figure 29:
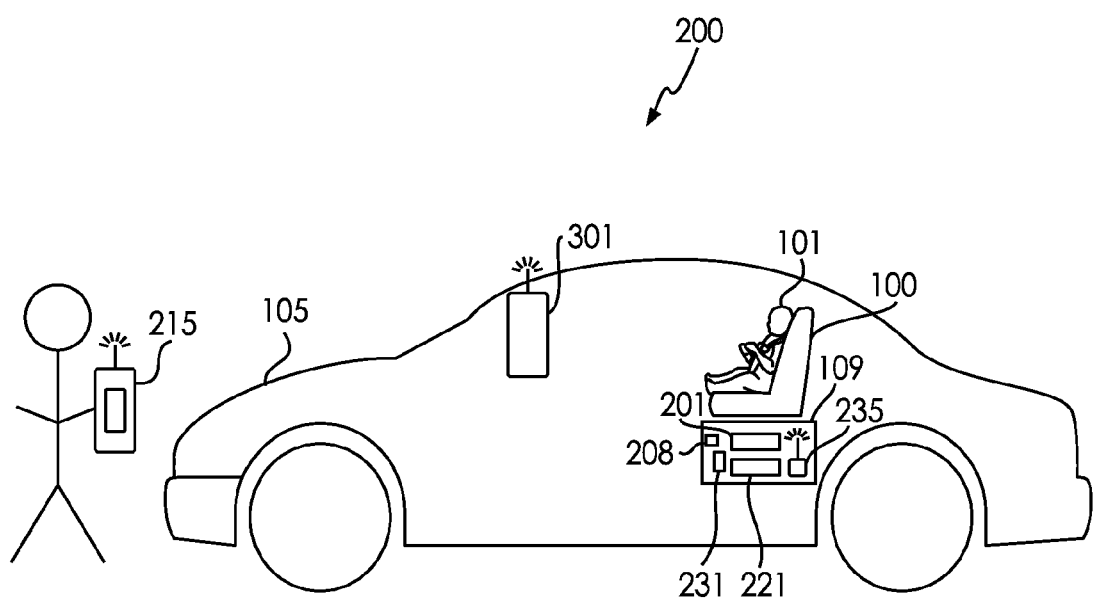
FIG. 29 provides a general block diagram of a remote alerting child seat safety system.

As shown in FIG. 3, the detector (201) is designed to be placed in the seat (100) or to be a component of the seat so as to detect the presence of the child (101). In the embodiment of FIG. 3, the detector (201) is a pressure sensor and therefore is placed under or within the padding of the seat where the child (101) will likely be reclined or sitting. In different embodiments, the sensor can be molded into the seat structure, attached to the seat structure (such as by hook and loop fastener), sewn into cushions or covers, or placed in a packet in the cushion or cover. In this way, the weight of the child (101) will activate a pressure sensor (201) to indicate that the child (101) is present in the seat (100). While the detector (201) in FIG. 1 is a relatively small and discrete device, it should be recognized that the detector can be relatively large so as to take up all or most of the space under the pad of the seat (100) in order to increase the likelihood of the child (101) contacting it when he or she is placed in the seat (100). Such a large device can also be useful to detect a sleeping pet or a child which requires a specialty carrier other than a seat. The monitor (2000) of FIG. 29 provides a slightly larger device which may be entirely positioned under or within the pad of the seat (100) centrally locating all components.

In a preferred embodiment of the system (200), the system (200) is generally never "off." Instead, the system (200) is always armed and either is indicating notification or the notification is temporarily disabled because the seat detects a "safe" situation. However, in an alternative embodiment, the system (200) can be turned off for long term storage or disuse. Generally, however, such ability to turn the system (200) off will not be simple and may involve removing a battery (203) or otherwise disconnecting a power source so that it is not done casually or simply.

In one embodiment, the device (200) may include a temporary disarm button (209) which is used so that the device need not be turned off when the seat is removed from the vehicle (105). This embodiment is depicted in FIG. 6. The temporary disarm (209) may be placed in the master housing (203), or along the wire (207) as shown, and serves to provide for a temporary ability to silence the alarm (211). This will generally be for a limited amount of time, such as, for about fifteen minutes or less. Generally, the disarm (209) will allow the user to indicate a time for disabling the alarm, or to immediately silence the alarm for a period of time. In a still further embodiment, the disarm (209) may be designed to allow the user to add a multiple number of disarms by pushing the button repeatedly, or by entering a specific disarm time to provide for a longer disarm. As opposed to a hardwire function as depicted in FIG. 6, the embodiment of FIG. 14 provides a software function on a remote receiver (215) to temporarily disable the alarm.

The temporary disarm (209) is to allow for the device (200) to be active when the child (101) is in the seat (100) but the seat (100) is not in the vehicle (105) or otherwise being used in a fashion that serves to disable the notification as discussed below. For this reason, a hardwire disarm button of FIG. 6 will generally only be used in car seats which are designed for infants (rearward facing) and where the child (101) is removed with at least a portion of the seat (104) in standard operation since it would only be in this situation where such a disarm would be desirable.

This temporary disarm (201) is provided so that the child (101) may remain in the seat (100) with the seat (400) being placed on a stationary surface without the alarm being triggered. In this way, the system (200) is not distracting or annoying because it provides notification when the seat (100) is not in a vehicle (105) or when parents are aware of the situation, but need additional time to remove the child. For example, if the system was used in conjunction with driving, the user then arrived at their location and knew that the child (101) was going to remain in the seat (100) while outside the vehicle are the system (200) may be triggered (for example if the seat was taken into church or a movie), the user could disarm (209) the system (200) for the amount of time that they would be out of the vehicle (105), it would then automatically rearm after that time.

In a still further embodiment, the system could include a rearm switch so that if the time the seat spent outside the vehicle (105) was less than was expected, the user could immediately rearm the system (200) instead of having to wait for the temporary disarm to time out. In an embodiment, this rearm could occur automatically by the system detecting the child (101) being removed from the seat (100) or the seat being repositioned relative to the vehicle.

In the depicted embodiments of FIGS. 1 and 23, the system (200) is always on and actively determining the situation. This can be a more useful embodiment when the child (101) is not expected to be in the seat (100) unless they are in the vehicle (105). In this system, the notification (211) is disabled only if the child sensor (201) determines that the seat (100) is unoccupied and therefore there is no need to notify the occupants in the vehicle (105) that there is a child (101) in the seat (100). In the disabled condition, the notification (211) will not generally sound to preserve battery life.

The method for determining occupancy can take a variety of forms. In the embodiment of FIGS. 1 and 23, the system for determining occupancy comprises a weight sensitive pad (201). This pad (201) will detect the mass of a child (101) being rested in the seat (100). The existence of such weight (which may be as little as 1 or 2 pounds) in the seat (100) triggers the system (200) to indicate that the seat (100) is occupied and arms the system (200).

In alternative embodiments, other child sensing systems (201) may be used. For instance, a child's body heat, or volume, instead of mass, could be detected. Such a sensor could detect that there is a warm object placed in the car seat (100), or could detect that an object having a particular volume is present. For instance, sufficient to break an invisible "line" between a transmitter and detector on opposing sides of the seat (100). Such sensors may be optical (e.g. an infra red emitter detector pair), acoustic, piezo-electric, force sensitive, capacitive, infra-red, mechanical, vision systems, or of any other type known to one of ordinary skill in the art.

In one such alternative, a motion detector, which may be a different function of the motion sensor (221), can be used as the child detector (201). This will generally determine if there is motion in the general area of the seat (100), for instance, as viewed from the back of a front seat. This can be the most optimal detection system for larger children where they may be on a booster seat or more open seat where they can move and possibly move off of a different type of sensor and are less likely to have fallen asleep.

In an embodiment, an infra red sensor can be used, although other sensors can be used such as, but not limited to, acoustic, radar capacitive or one could tie into one of the vehicle's (105) existing sensors, transmitters, or vehicle (105) electronic system to establish the presence of an intruder. Examples of this are the airbag sensor used to determine the occupant's size and weight or the sensor used to level the vehicle's (105) suspension or the sensor that detects the presence of an occupant for the seat belt fastener. It should be apparent that a motion sensing system may be more useful for larger children (or in an alternative embodiment for pets) where they may not be confined to a car seat.

In a still further embodiment, detection of the child (101) can be through the use of a secondary indicator. For example, the detector (201) may not detect the child but may detect an indication that a child could be present. For example, the detector (201) could detect that the seat belt in the seat (100) is fastened, that the straps have been tightened recently, or that the orientation of a seat has changed (likely to a mass being placed on it). These types of detectors (201) only indirectly detect the child (100) as they detect a situation that commonly occurs when a child is present instead.

The system (200) can also interface with the seat belt buckle internally or externally which can indicate to the controller (231) when the seat belt buckles are latched. Such information can be used by itself or in conjunction with the child detector (201). Similarly, the controller (231) could be part of the seat belt strap, where tension on the strap can indicate presence of a child. Tension sensors can be integral to the seat belt strap and/or buckle, or could be part of a mechanism that holds the strap to the structure that secures the seat belt strap to the seat (100) in such an embodiment.

While the above contemplates detection of temperature to detect the heat of a child in a seat, it should be recognized that in another embodiment the system (200) can include a temperature sensor to detect the heat a child (100) may be exposed to. It is well recognized that one of the principle dangers of a child (100) being left in a vehicle (105) is that the vehicle (105) will often heat up and the child will suffer hyperthermia. A temperature sensor (208) can be provided which allows for the temperature inside the vehicle (105) to reported as part of the system (200) as part of triggering the alarm (211). By reporting the temperature, the individual receiving the alarm signal can recognize the potential severity of risk immediately and that may trigger additional or alternative action. For instance, if the temperature is already approaching a highly dangerous level, the receiver may take more drastic or immediate action such as remote starting the vehicle (105) or activating climate control systems instead of trying to return to it.

In addition to the use of a temperature in conjunction with determination that a child (101) is being left in the vehicle (105), the temperature sensing component can be used as a stand-alone feature. Specifically, the temperature sensor can present a specific alarm that indicates that the temperature is too high in the cabin, and, even if the parent is also determined to be present, an alarm can be sent to them trying to get them to lower the temperature, or the vehicle can be directly instructed to engage a climate control system. The thresholds for temperature and associated alerts can be set by the user, in an embodiment, as shown in FIG. 16C.

In a still further embodiment, one could utilize the system (200) effectively in a reverse manner to provide an alternative protection system (200). If the parent is concerned about a child possibly undoing a seat belt or getting out of the seat (100) while the vehicle (105) is moving, an alarm (211) could also be triggered by the sensing of the child (101) moving outside the seat (100) area, or detection that the child (101) is no longer in the seat (100). This alternative mode of operating can simply provide for a different notification sound in the embodiments of FIGS. 1 and 6 when the pressure switch (201) is released indicating that the child is no longer in the seat (100) (possibly by having an alternative sensor that detects unlatching of the seatbelt) or may provide a different alert screen (FIG. 12 or 14) to that of a child left alert (FIG. 13 or 20) in the embodiment of FIG. 29. This detection may occur while also detecting whether the vehicle (105) is in motion or not.

This embodiment and operational method may be particularly beneficial for slightly older children where the risk of them being left unattended is decreased, but their increased independence could result in such a dangerous situation with them not being properly restrained. In an embodiment, the system (200) may include the ability to switch between these modes so as to provide for increased functionality or to operate in both modes simultaneously.

Child detection systems (201), such as those discussed above, can be used singly or in combination, depending on the embodiment, to arm the system (200). For example, a mass sensor may be used to detect the presence of a small child in a carrycot or other hand carrying portion of a car seat (100). A volume detector may then be used to determine if the carrycot or hand carrying portion has been connected to a mounting system located in the vehicle (105) which is designed to secure the child (101) in the vehicle (105) without need of transferring the child (101) between carriers. Unless both systems indicate the presence of the child (101), then the system (200) remains disarmed. In this way, a child (101) does not need to be removed from the seat (100) to disarm the system (200) as the parents would normally remove a portion of the seat and the child (101) instead. Further, this type of arrangement also provides that the manual disarm (209) of FIG. 6 may not be necessary on such a seat (100).

To detect that the vehicle (105) is not in operation, the embodiment of the system (200) depicted in the FIGS. includes a motion sensor (221) which is used to establish if the vehicle (105) is moving or not. Specifically, in the depicted embodiment, the motion sensor comprises a three-dimensional accelerometer which is designed to detect the acceleration of a vehicle (105) which may be in any dimension and any number of dimensions. However, one of ordinary skill in the art would understand that other types of motion sensors could be included such as, but not limited to, remote positioning systems (such as GPS), inertial systems such as gyroscopes, infra red, capacitive or acoustic sensors, or magnetic field sensors. Still further systems designed to detect the vehicle's (105) function, but not necessarily motion, could be used, such as, but not limited to, wireless transceivers for detecting a vehicle's (105) wireless signals, a transceiver tied into the vehicle's (105) electrical system, or the other sensors used to establish speed or engine function or to monitor battery voltage for fluctuations that occur during starting and or stopping the vehicle (105). Optical sensors systems could also be used to detect changes in ambient light levels or otherwise detect changes in scenery indicative of motion. Still further, acoustic or vibration sensors could be used to detect engine or vehicle (105) noise or vibration indicative of a running or moving vehicle (105).

It should be recognized that the motion sensor (221) is designed to detect particular types of motion in a preferred embodiment. Specifically, the motion sensor (221) should preferably be able to distinguish the motion of a vehicle (105) which is "in motion" from motion that is not so indicative of the vehicle being in motion. For purposes of this disclosure, a vehicle (105) is considered "in motion" or "in operation" when the vehicle (105) is being physically displaced through space. Thus, the vehicle (105) is being driven (in forward or reverse), is being pulled forward or backward under the effect of gravity, or is otherwise displacing along the surface of the Earth (such as by being pushed or towed). In most cases, the "in motion" activity can be linked to a rolling motion of the tires or active use of another motive system (such as a boat propeller, a track drive, or airflow through a jet engine or propeller).

In this disclosure, however, the term "in motion" generally does not apply to a vehicle (105) which is stationary. It should be recognized that a stationary vehicle (105) can still be "moving" (for example, it can be vibrating due to motion in the engine, can be rocking on its springs due to movement within the cabin, or can be oscillating due to the wind blowing on it) but such a vehicle (105) is not "in motion" as defined herein because the vehicle (105) is not being physically displaced, it is only moving in place. It should also be recognized that generally the system (200) is more interested in determining if the vehicle is not "in motion" than if it is "in motion." Thus, a default position is that if a vehicle cannot be affirmatively determined to be "in motion," the vehicle is presumed to not be "in motion."

It should also be recognized that it is preferable to determine if the vehicle (105) is in motion and not if the seat (100) is in motion. Depending on the type of car seat (100) and the age of the child, it is highly likely that the seat (100) may experience motion relative to the vehicle (105) which is not indicative of vehicle (105) motion. For example, a child in the seat (100) may be moving which can cause even a tightly strapped seat to sway in place or rock. Further, the seat (100) may be being carried by hand and not in a vehicle (105). This type of hand movement is generally not concerning as it is not indicative of vehicle (105) motion.

An accelerometer can be a beneficial motion sensor (221) because it will trigger the alarm (211) whenever the vehicle (105) comes to a halt, or is otherwise not accelerating. Further, the accelerometer (221) is simple and robust and, while sensitive to the stopping of the vehicle (105), it will generally not trigger an alarm situation while the vehicle (105) is in motion even if the motion is erratic or very slow. Even under the command of cruise control or other computer aided piloting programs, a vehicle's (105) speed is rarely perfectly constant when it is in motion due to subtle alterations in terrain, air pressure, and other external factors, but instead there are slight fluctuations in the speed over time. These small accelerations will generally result in the alarm system (211) not being activated to indicate a left child situation (although a child having gotten out of their seat or a temperature warning may still be indicated) while the vehicle (105) is in motion. At the same time, a vehicle (105) at rest will rarely incur any acceleration indicative of being in motion and the alarm (211) is therefore reliably activated.

It should also be noted that in an embodiment, the motion sensor (221) and/or controller (231) is generally programmed to parse received motion data to recognize acceleration specific to a vehicle (105) being in motion and eliminate noise from the signal where the noise may be motion of the seat (100) relative to the vehicle (105) (e.g. from a child kicking it), motion internal to the vehicle (105) (e.g. from engine vibration), or motion that is likely not caused by movement of the vehicle (105) (e.g. a stationary vehicle (105) being buffeted by a strong wind).

In an embodiment, a vehicle (105) being in motion is detected by having the acceleration be determined along a particular axis with the motion sensor (221) and/or controller (231) being capable of determining if a component of motion is repeatedly along that same axis. Generally, when a vehicle (105) is in motion, it will be translating in a generally linear fashion. Even when turning a corner, vehicles (105) generally still have a linear aspect to their motion. In order to detect such linear motion, use of a multi-dimensional (3-axis) accelerometer as the motion sensor (221) will generally be preferred. A multi-dimensional accelerometer does not require a specific orientation relative to the vehicle (105) in order to detect the motion of the vehicle (105) and can detect that the vehicle (105) is going forward, backwards, or even sideways, in a consistent fashion. As all dimensions of motion can be evaluated, linear, forward or rolling motion (indicating a vehicle (105) in motion) can usually be segregated from rocking, vibrational, or oscillating motion (which are not indicative of a vehicle (105) in motion).

Use of a multi-dimensional accelerometer can also provide for noise reduction in the motion signals allowing for more reliable vehicle (105) motion to be detected. As discussed above, it is very possible that a vehicle (105) is not only in motion, but is moving due to other factors. For example, a high-profile vehicle (105) (such as, but not limited to a minivan) may be being buffeted side-to-side by a strong cross wind while it is moving down the highway or sitting in a parking lot. In this situation, the motion "noise" caused by the wind needs to be reduced in order to detect the signal indicative of the minivan's displacement, which may be relatively small (for example, if it was stuck in slow moving traffic). The buffeting of the wind, however, will generally be a different motion to that of the physical displacement of the minivan. For example, a vehicle (105) being rocked by the wind will generally move in a first direction along an axis as the wind pushes it, and then generally rock back along the same or similar axis as the wind dies down. Thus, the motion will be a "forward and back" or more rocking or oscillating motion. To put this another way, this motion will generally be bi-directional (reverse directional) along a particular axis. A displacement motion, however, will generally be more linear or uni-directional along a particular axis to allow for physical displacement.

In order to factor out noise and determine that a vehicle (105) is in motion, the controller (231) will generally be programmed to parse the motion sensor's (221) output and determine if motion being detected is relevant to the vehicle (105) being in motion or is simply noise. The following provides for an embodiment of a computational scheme which can be used to segregate vehicular "rolling motion" from other motion to which the vehicle (105) may be subject.

In an embodiment, raw accelerometer data is first obtained in all three dimensions. The data will generally be provided as an ongoing string of data values where each data value comprises the cluster of three individual dimensional values (x, y, and z) of the detected acceleration. This detection will generally occur very fast and, in an embodiment, is obtained approximately 100 times each 0.2 seconds. After a fixed number of values are obtained, which in an embodiment is every 35 readings or approximately every 0.07 seconds, the clusters of data for that window is averaged and stored as a new cluster in a new array. FIG. 30A shows an embodiment of one such cluster (3007).

The averaging across the 35 values allows for smoothing of the data which can serve a dual-fold purpose. In the first instance, the averaging can serve to eliminate electronic noise in the accelerometer and other electronic components. Further, the accelerometer is likely to be too sensitive to motion for an object the size of a typical vehicle. An automobile is generally not capable of very fine control (e.g. one cannot purposefully and consistently change its speed in the space of hundredths of a second). Thus, the averaging serves to eliminate small detected accelerations that are unlikely caused by macro movement changes as would be expected for a large object under real world conditions.

After the averaging is complete for a number of sensor periods and the average clusters are obtained, for example after 4 clusters of averages have been obtained, the values of the adjacent clusters are placed in a window as shown in FIG. 30B and compared. Generally the clusters are compared using a first-in-first-out (FIFO) window. Thus, a specific number of clusters are maintained in the window, but those clusters are always the most recent. In an embodiment, four clusters are maintained in the window (although that number is not required) as shown in FIG. 30B and thus the most recent cluster (3007) is present (those averaging the present time 0 reading to 35 readings ago) along with the three immediately prior (36 to 70 readings ago (3005), 71 to 105 readings ago (3003), and 106 to 140 readings ago (3001)). As new data is obtained, the oldest cluster of data is removed and replaced with the newest data.

To determine the relevance of motion, each of the clusters is compared to the immediately prior and it is determined if there is a change along any of the three axes. Changes in these clusters are shown in FIG. 30C as clusters (3013), (3035) and (3057). For each axis where a change is detected, a delta (change) variable is generally indicated to be true as shown in the clusters (3113), (3135), and (3157) of FIG. 30D. Thus, there is now an array of clusters of three true/false values corresponding to each of the comparisons of clusters of averages as shown in FIG. 30D. For each cluster (3113), (3135), and (3157) that includes at least one "true" (indicating a change compared to the prior set) an initial indicator (3213), (3235), and (3257) that motion is detected in that cluster is set to true as shown in the array FIG. 30E. Thus, there is now an array of three values (3213), (3235), and (3257) which each now comprises either true or false as shown in FIG. 30E. This is the array for the detection of any motion.

Figure 30F:
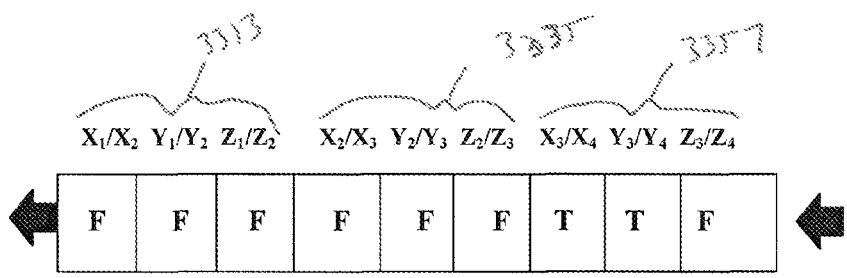
Figure 30G:
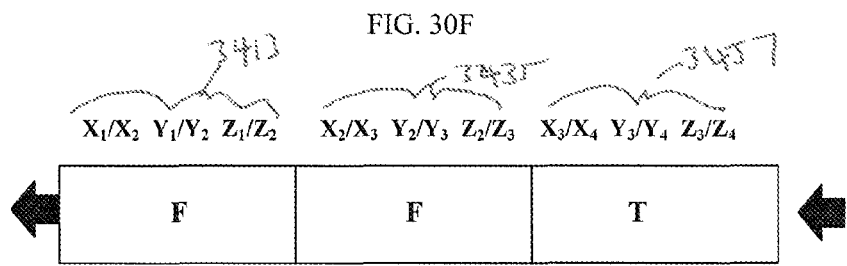

In the event that a set in FIG. 30E has a true value for motion being detected (all three sets in this example), the magnitude of the motion relative to the prior set is determined (the value of FIG. 30C). The magnitude is then generally compared (in all three dimensions) against a predetermined minimum. In the event that the magnitude is above the predetermined minimum (3 in this example), a value for magnitude of motion is also set to true for the corresponding value in each cluster (3313), (3335), and (3357). Otherwise it is set to false. This is shown in FIG. 30F. Like with FIG. 30D, the three values in each cluster (3313), (3335), and (3357) are considered with any true making the individual cluster value (3413), (3435), and (3457) true as shown in FIG. 30G. This is the magnitude value.

Figure 30H:
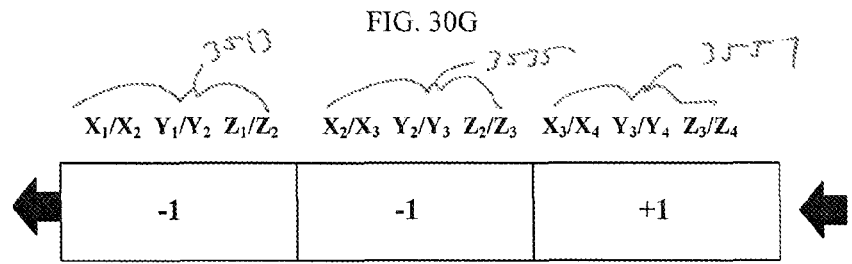

It should be apparent from the above, that each value in the now two value three long array in FIG. 30E and FIG. 30G correspond to the change and magnitude values for each cluster of accelerations. To put this another way, one can place elements (3213) and (3413) in a set together, elements (3235) and (3435) in a set together, and elements (3257) and (3457) in a set together. It is noted that the array of FIGS. 30E and 30G is three because four clusters were originally used. More generally, each array has n−1 value where n is the original number of clusters of values in the original array (FIG. 30D). Thus, each window period (cluster) has one of three possible sets of two values associated with it. In the first option, the indicator of motion is set to false and the magnitude is simply not determined. In the second option, the indicator is true and the magnitude is false. In the third option, both the indicator and the magnitude are true. In the event that the third option is present, the value of a final variable, relevant motion, is set to +1, otherwise it is set to −1 as shown in the various values (3513), (3535), and (3557) of FIG. 30H. The stream of relevant motion variables is then provided to a running tally.

The values (3513), (3535), and (3557) in this tally stream (FIG. 30H) are then used to modify a static calculation. Specifically, for each of +1 values, the tally is increased by one, for each of the −1 values the tally is decreased by one. As the window in the array discussed above includes an odd number of values, the tally is essentially never static, but will always be increasing or decreasing. In this case, the window of FIG. 30H will net decrease the tally by 1. It can be seen that since the tally is ongoing, as a new cluster comes in and the oldest is reversed, the value of the window will always be acting to increase or decrease the current tally.

The tally is then compared to a fixed base value. In the event that the tally is below a certain minimum, the vehicle is determined to not be in motion. If the tally is in a middle window, the result is generally considered in transition. If the tally is above a certain higher threshold, the vehicle is generally considered to be in motion.

Generally, a transition determination will simply leave the determination at whatever it was previously, thus, if the vehicle is in motion, it is not considered to not be in motion until the value passes the lower threshold and similarly a vehicle detected to not be in motion will not be determined to be in motion until the tally passes the higher threshold. For the triggering of an alarm, the presence of a predetermined number of "not in motion" determinations will generally act to trigger that the vehicle is not in motion and, if the child's presence is detected in the seat, an alarm scenario is triggered.

While the use of an accelerometer within the vehicle is a useful methodology to detect motion, it should be recognized that in an alternative embodiment the motion sensor (221) need not be part of the seat (100) device but may be a part of the vehicle (105) itself. For example, the motion sensor (221) may detect that the vehicle (105) is likely "in motion" due to signals from the vehicle (105) instead of signals from an on-board sensor. In an example, the controller (231) may receive an indication of whether the vehicle's (105) transmission is in park, a clear indicator that the vehicle (105) is not moving. Similarly, wheel rotation sensors (such as, but not limited to, those used with anti-lock braking systems) can be used to indicate that the vehicle (105) is in motion as the wheels are turning.

In a still further embodiment, motion sensors (221) can be both in the vehicle (105) and in the seat (100) and can be used to verify or counteract effects from other sensors. For example, a motion sensor (221) in the seat (100) can be used to detect the vibrational or more random motion that a child banging his feet against the seat may generate. This motion can be used to confirm a finding of the child detector (201) that the seat (100) is occupied or may be used instead of the child detector (201). Simultaneously, the controller (221) may be receiving a signal that the vehicle's (105) wheels are currently turning in a forward manner from the vehicle's (105) onboard systems and this can be used to segregate out a component of the motion at the seat (100) indicative of the seat (100) moving forward as detected by the motion sensor (221). Verification that such a linear translational component of motion exists can result in each component (221) and (201) now having a double check to determine that a child is indeed in the seat (100) and the seat (100) is in motion.

In order to provide for command and control of the system (200), the system (200) will generally include a controller (231) which is generally a processor or similar device which serves to control operation of the various components. It may, in an embodiment, include a clock circuit to determine if an alarm (211) should sound based on activation by the motion detector (221), or other functions and features (such as, but not limited to, associated memory) to provide additional functionality.

The system (200) will also generally include a notification or alarm (211) in order to communicate a system status to a user. In one embodiment the alarm (211) may be audible and designed to sound only a few seconds after a vehicle was no longer in motion. If the alarm (211) was designed to be more obtrusive, this may be undesirable. The delay chosen will, therefore, generally depend on the nature of the alarm (211) that is present or may be set by a user such as through FIG. 19. In the event the alarm (211) is a subtle reminder type of alarm (211), the control (231) may include no or little delay. In this way, whenever the vehicle (105) comes to a complete stop, the driver is reminded of the presence of the child. In effect, the system (200) provides a much more constant reminder. If the alarm (211) is more intrusive, the delay may be for a longer period of time. In this way, the alarm (211) is not generally triggered at a stop light or other stopping situation where the vehicle (105) is stopped, but not parked, but will trigger if the vehicle (105) is parked and remains so for a reasonable period of time. In another embodiment, the control may include memory for storage of alarm conditions, a log of operation history, operational or test software, or other executable instructions for the processor.

While the reminder system (211) is generally an audible system which is designed to produce an audible reminder that there is a child in the vehicle (105), the alarm (211) may comprise audible, tactile, visual, electronic, or any other stimulant reminder that the child is present in the vehicle (105). The reminder system (211), depending on embodiment, can comprise a subtle but specific reminder of the presence of the child all the way to a shrieking alarm system designed to attract the attention of passers-by to examine the vehicle (105) and possibly rescue a child which has been inadvertently left in the vehicle (105).

In an embodiment, the alarm (215) is a software or similar application implemented on a remote device which allows for ready portability and can provide an alarm external to the vehicle (105) without necessarily notifying passers-by. This alarm is contemplated in FIGS. 7 and 28 where the alarm may comprise external contacts such as, but not limited to, a smartphone, the vehicle itself, or caregivers such as a 911 operator or rescue personnel. Because the alarm may be executed in a remote device, such as computing device, in an embodiment the alarm may be a software function or a series of executable instructions stored on a computer readable memory which are designed to operate various pieces of computer hardware to perform various functions to implement the alarm (211).

In an embodiment, the system (200) includes multiple different alarms, such as to provide for an escalating alarm system. In one such embodiment, the system may provide a subtle reminder for a period of time purely within the cabin of the vehicle (105) using an alarm (211) on the seat (100). If the child (101) has not been removed within this period of time, the system (200) may escalate to a longer ranged alarm such as contacting a parent's cellular phone (215) (e.g. by text, email, or voice). In the event that the child (101) has still not been removed, the system (200) may initiate an alarm designed to alert passers-by to locate the vehicle's (105) owner or determine if an unattended child is in the vehicle (105), such as by an external blaring alarm or triggering the vehicle's (105) anti-theft system. Finally, a highest level alert could result in direct contact with emergency personnel (e.g., a 911 call) to investigate a possibly dangerous situation.

The alarm system (211) may be self-contained and external to the vehicle's (105) electronics communicating via wire or wireless methods with the remaining components of the system (200), may be integrated with the vehicle (105)'s existing electronics (e.g., so as to allow the vehicle's (105) horn to sound upon an alarm condition), or may interface with other objects the parent may have, such as a cellular phone, pager, or other wireless device that they are likely to have with them.

The system (200) could communicate via wireless communication and/or hard wire to the alarm (211) based on the design and the type of alarm system (211) that is to be activated. In the depicted embodiment of FIGS. 1 and 6, the alarm (211) comprises a subtle reminder system.

In the case of a more subtle alarm, there is generally little to no delay on the motion sensing system (221) detecting that the vehicle is not in motion and triggering the alarm (211) as soon as no vehicle (105) acceleration is detected. In the depiction of FIGS. 1 and 6, the alarm (211) comprises a speaker and associated electronics with a memory of classic children's songs (such as lullabies). Upon detection that the system (200) is armed and the vehicle (105) is not in motion, the alarm (211) will play a brief excerpt (from between 15 and 30 seconds in an embodiment) of a song. This reminder will be transmitted via an attached speaker and will generally only be audible to a vehicle's (105) occupants or those nearby if a door or window on the vehicle (105) was open. This type of alarm (211) is designed to be subtle and non-intrusive while still serving as a reminder of the presence of the child (101). The reminder is particularly useful because since it is non-obtrusive it can sound repeatedly without necessarily being an annoyance. For example, the alarm (211) will generally sound each time the vehicle (105) comes to a stop, such as at a stop light to remind the parent that the child (101) is in the vehicle (105).

The Alarm (211) will also sound when the vehicle (105) is parked serving as another reminder to remove the child (101). Once the notification has sounded, the system (200) may enter a wait mode where it will not notify for a longer period of time. If no movement has been detected, the alarm (211) may be sounded again. In this way, the system does not become annoying if the vehicle (105) is stopped at a stoplight, while still making sure that notification is given.

In the alternative embodiment of FIG. 29, there is provided a device (200) which communicates wirelessly with the vehicle's (105) on-board computer/electronics (301) and/or other wireless device (215) in a peer to peer network or multi-node network whereby multiple devices, such as cell phones, personal computers, home computers, tablets (e.g. Ipads™) routers, wireless networks, etc., are communicating and sharing data that aids in the decision making process. Data that is exchanged between the devices includes, and is not limited to, Child in Seat while vehicle in motion, Child out of seat while vehicle in motion, Child in Seat while vehicle not in motion, Acceleration data for X, Y and Z axis, Field Strength Data, GPS Data, Battery Level, Temperature, Caregiver present, Seat belt fastened, door open and other functions as discussed herein.

In an embodiment, the system (200) as shown in FIG. 29 generally comprises a remote system (215) which is capable of receiving communication from the child sensor device (200). This remote system (or alarm receiver) (215), will generally not be specific to the system (200), but will instead comprise a common object that many parents carry. In the embodiment discussed herein, this comprises a mobile phone device (smartphone) or similar device which is capable of receiving some form of communication (text, voice, voice and text, Internet Protocol, Bluetooth™, WiFi, Broadband, etc.) and which can act as an alarm receiver (215) when appropriate. The receiver (215) may include programming or software (such as in the form of a software application or "app") to place in this capacity.

It is preferred that a device (215), such as a mobile phone, be used to provide the alarm (211), as such a device is commonly already carried and used by a parent and is fairly specific to them. Further, in today's constant communication society many parents are very attuned to responding to alerts from their smartphone (in the form of incoming calls, emails, texts, or other data) regardless of source or importance. Thus, the parent is likely to carry the device with them at all times, and to be responsive to alerts it provides. A custom notification system (215) may be provided in an alternative embodiment, but that is generally not preferred as it is more likely a parent would forget to carry it.

Figure 7:
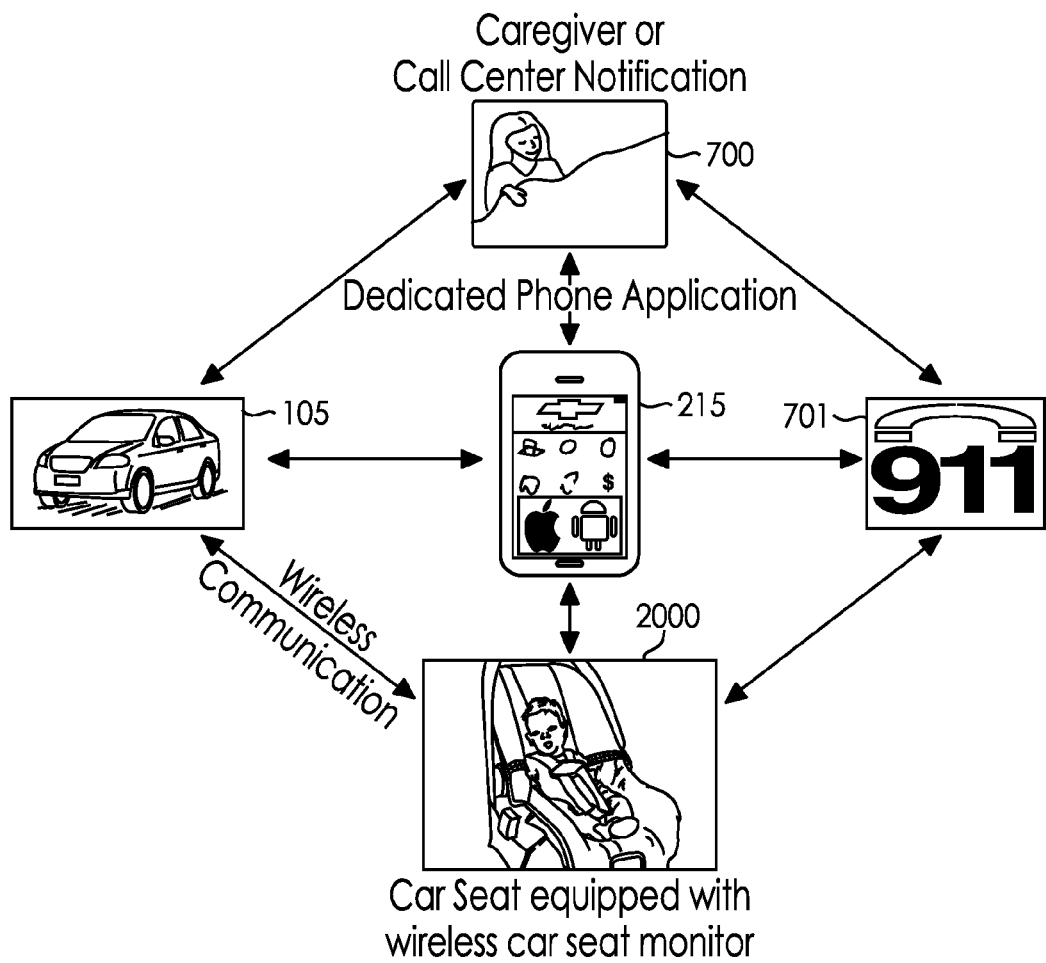
FIG. 7 provides a general block diagram of communication options.

In FIG. 29 there is also shown a communication system (235) which is designed to interconnect the monitor (2000) components in the car seat (100) with the components (215) and (301) which are designed to communicate an alarm. Generally, this will comprise some form of wireless communicator which can either work directly with the alarm receiver (215), or can work through the vehicle (105) using onboard vehicle communication systems (301). FIG. 7 provides a general overview flowchart of interactive communication where the seat device (200) can communicate to a dedicated carrier (700), 911 emergency (701), a remote smartphone (215), or the vehicle (105).

In most vehicles (105) today there is already a wireless receiver/transceiver (301) typically for picking up the Key FOB signals and Tire Pressure Monitoring signals. It is becoming more common to see Bluetooth, RFID, and WIFI transceivers in vehicles (105) to communicate with external devices, etc. Further, vehicles (105) may include installed wireless devices such as third party GPS receivers. For a vehicle (105) to communicate with external devices would generally only require a software change which is very inexpensive as compared to adding a dedicated receiver or transceiver. A hard wired vehicle (105) seat-monitoring device is generally expensive, adds complexity, and warranty to all cars and even when the purchaser or user of the vehicle (105) may not have children or a need for this sort of device, they still have to pay for it. An advantage is that an after-market or car seat installed device can be sold separately in the dealership or into standard retail and after-market channels and used only if needed.

Field strength of the wireless signal between the two devices (specifically the car seat device (200) and alarm receiver (215)) can be used to determine if the distance between the two is increasing or not. Such an increase is a sign that the parent or guardian is potentially forgetting the child in their vehicle seat (100) as they are moving away from the vehicle (105) while the child (101) has been determined to still be in the vehicle (105). Acceleration measured internally on the receiving device (215) (such as the internal position sensing systems) can also be compared to the 3 axes of acceleration measured on the vehicle seat (100) mounted monitor (2000) and can be used to determine relative movement between the vehicle (105) seat and caregiver's receiving device (215) over a period of time. If both are in the vehicle (105) together, and the vehicle (105) is in motion, the acceleration profiles should be similar. A case where the child (101) is in the seat (100) and the vehicle (105) is parked will have little or no acceleration changes detected, and if the caregiver's phone detects measurable changes in acceleration over the same period time, this is an indication that the caregiver could be moving away from the vehicle (105) without the child (101). This signal is meant to be a redundant check, to aide in eliminating false alarms and improving accurate alarm response but can be used as such.

Similarly to the device of FIG. 1, when the child (101) jumps out or is removed from their seat (100), the child detector (201) will change state, which is detected by the controller (231) and transmitted to the receiving device (215) or a vehicle notifier such as a dashboard warning light.

In the case of it being a smartphone application, the phone (215) will preferably display an alert screen and audible or vibratory signal to alert the caregiver. In addition, the phone or device (215) can also send a message to a third party via the cellular network (for example a Text Message, IM, or E-Mail). This message could contain any combination of the following data: Child in seat, Child out of seat, Vehicle Moving, Velocity, GPS location, Altitude, Temperature in vehicle seat and so on. FIGS. 11-22 provide for various screenshots of different indicators that can be provided to the phone (215) and also provide for indications of bow to control the car seat monitor (2000) from the phone (215). The provision of multiple different types of information generally provides for improved safety and helps in the determination by the parent if a danger situation exists. Specifically, the system (200) can provide for a remote monitoring situation where the parent can remotely be alerted to the status of the car seat (100), and therefore any potential child (101) within it, at any time.

While not depicted in the FIGS., in the event that a predetermined number of alarms have sounded indicative that the child (101) may not have been moved (for example 300 seconds has elapsed since the initial alarm) and the parent may no longer be present, the control (231) may escalate the alarm. In an embodiment, this comprises activating a wireless transmitter that contacts a parent's cell phone or a device such as a Bluetooth™ receiver provided with the system and which the parent is supposed to have with them at all times. The system (200) may then wait for a response. If the parent knows this to be a false alarm, they may indicate on their wireless device resetting or disarming the system (200). If the system (200) does not receive a response from the parent, the system (200) may escalate further and possibly sound an external alarm on the vehicle (105) trying to attract the attention of passers-by to get them to break into the vehicle (105) and rescue the child (101), utilize a contact system such as OnStar™, or initiate other actions.

It should be noted that one advantage of using an accelerometer (221) sensitive to vehicle (105) motion to reset a system (200) with an escalating or other external alarm is that it allows a vehicle (105) occupant to easily reset a false alarm. For example, should the parent be stuck in traffic and the alarm be escalating or sounding, they can easily reset the timers by simply allowing the vehicle (105) to roll forward a short distance, which motion is detected by the system and results in a reset. Further, even in heavy traffic it is unlikely that the vehicle (105) will not be moving at all naturally inhibiting alarm escalation.

FIGS. 11-22 provide for a number of screenshots of an embodiment of a smartphone application which is designed to provide feedback from the device (200). These show an embodiment of how an alarm (211) system can be implemented on a remote device.

Figure 11:
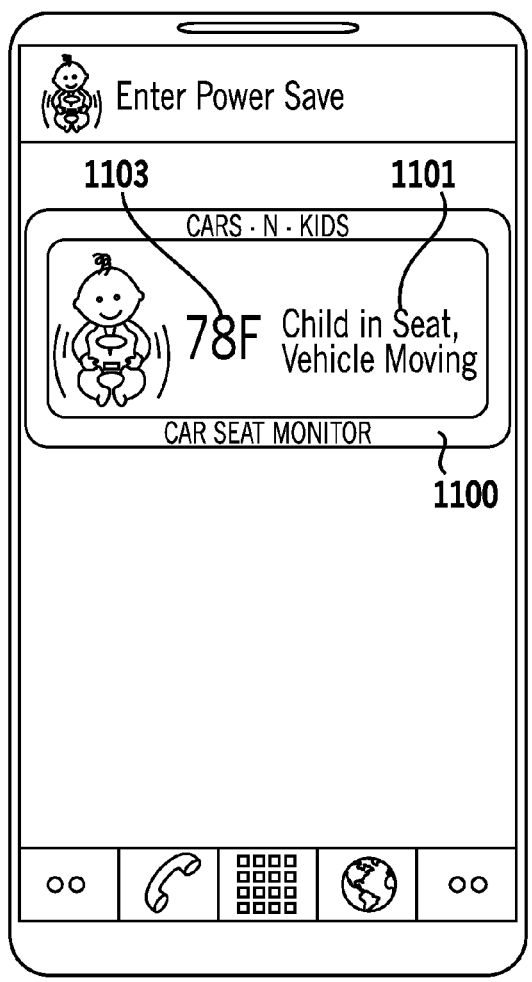

FIG. 11 provides for a general hold screen that would be present when the vehicle (105) is moving and a child is in the seat. The safe message (1101) indicating status is provided in a display block (1100) along with an indication of temperature (1103) in the vehicle (105). This screen would indicate that the application is running and the child is being monitored, but that there is no current alert. That is, in this situation the device (200) is active, but the child is believed to be safe.

Figure 12:
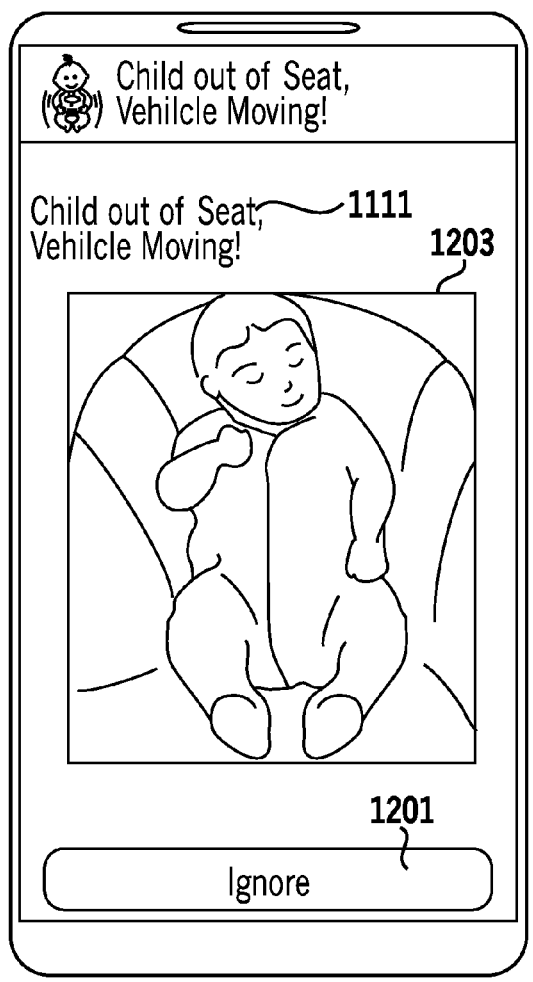

FIGS. 12 and 13 provide for alert indications. These would generally be provided to the parent because certain potential danger situations have been detected by the system. In FIG. 12, the situation is that the child may have gotten up from the seat (sometimes referred to as a "bailout" situation) while the vehicle (105) is in motion, or may be straining against the straps which may put them in a danger situation should an accident occur. FIG. 13 shows the alarm for the child who is left in the seat after the vehicle (105) is stopped.

Figure 20:
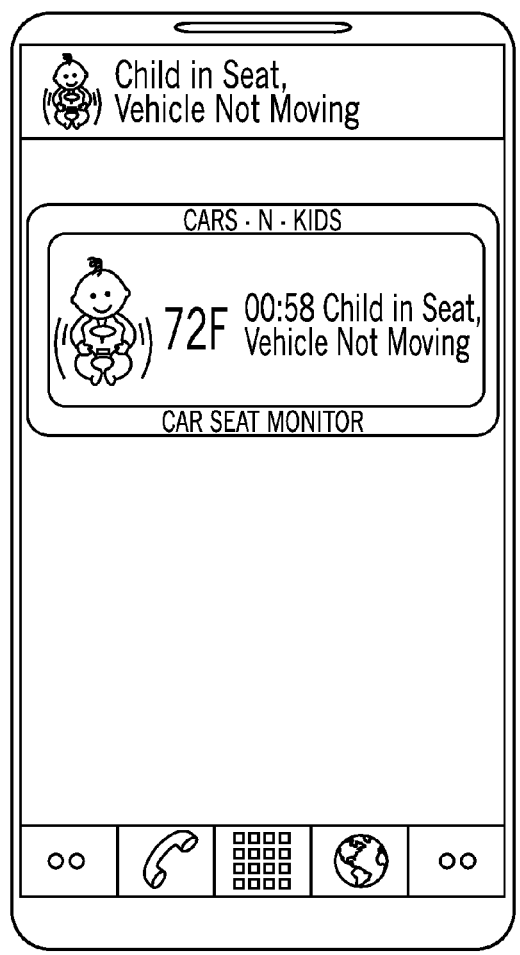
Figure 21:

In both cases, the alert includes an "ignore" button (1201) which allows the parent to silence the alert if they know it to be a false alarm. For example, if the child is in the seat (100) and the vehicle (105) has stopped, but the parent has not yet removed the child, but knows he or she is there. The ignore button (1201) will generally not disarm the system (200), but will simply serve to quiet the alarm for a certain period of time. If the alarm situation is detected after that time has elapsed, the alarm will generally be triggered again. FIG. 14 provides an alternative embodiment to FIGS. 12 and 13 where the warning message (1111) is provided in display block (1100) having a more consistent look to FIG. 11. There is also provided in FIG. 14 a clock display (1105) indicating how long the alarm situation has existed. All of FIGS. 12, 13 and 14 also provide a photo (1203) to personalize the message which is not necessary but may be desirable as discussed below. The embodiments of FIGS. 20 and 21 provide for a similar layout without inclusion of a picture.

It is important to recognize that this phone application can be running all the time and when the child (101) is placed in the seat with the monitor (2000), the two may automatically recognize one another forming the complete system (200). The phone application can also be configured to automatically start when the phone is turned on. The phone (215) can initiate the connection or the vehicle seat monitor (2000) can initiate the connection. Thus, FIGS. 8, 9, and 10 show the various common indicators of the running application.

Figure 8:
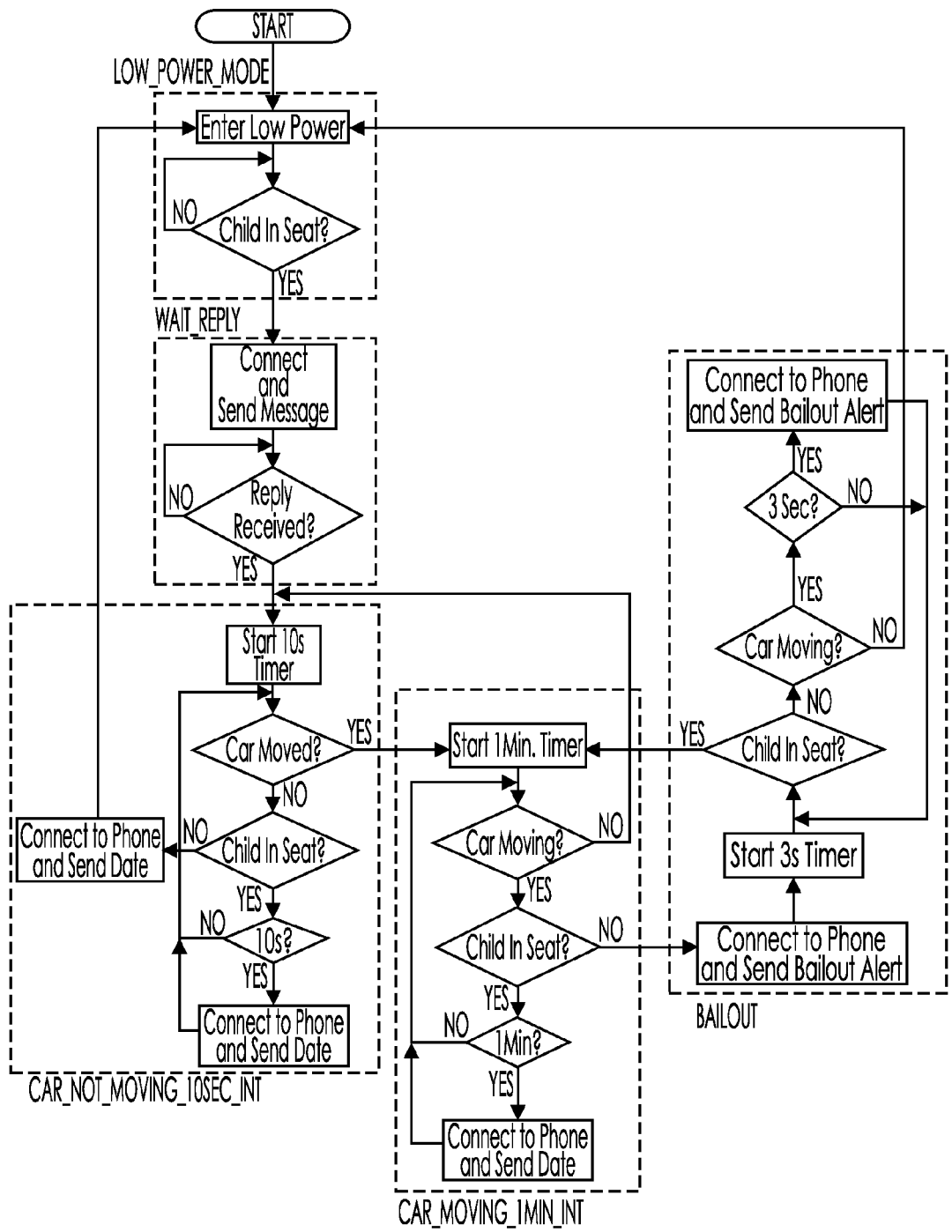
FIG. 8 provides a flowchart of operation of a an embodiment of a child seat safety system FIG. 9 provides a state diagram of an embodiment of a child seat safety system.
Figure 9:
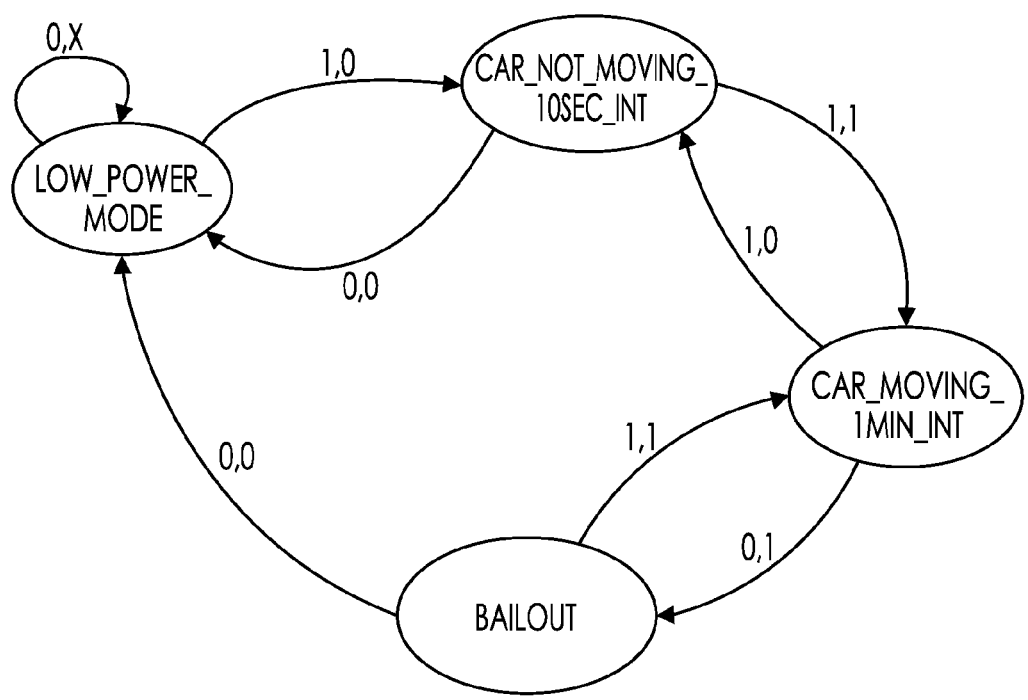
Figure 10:
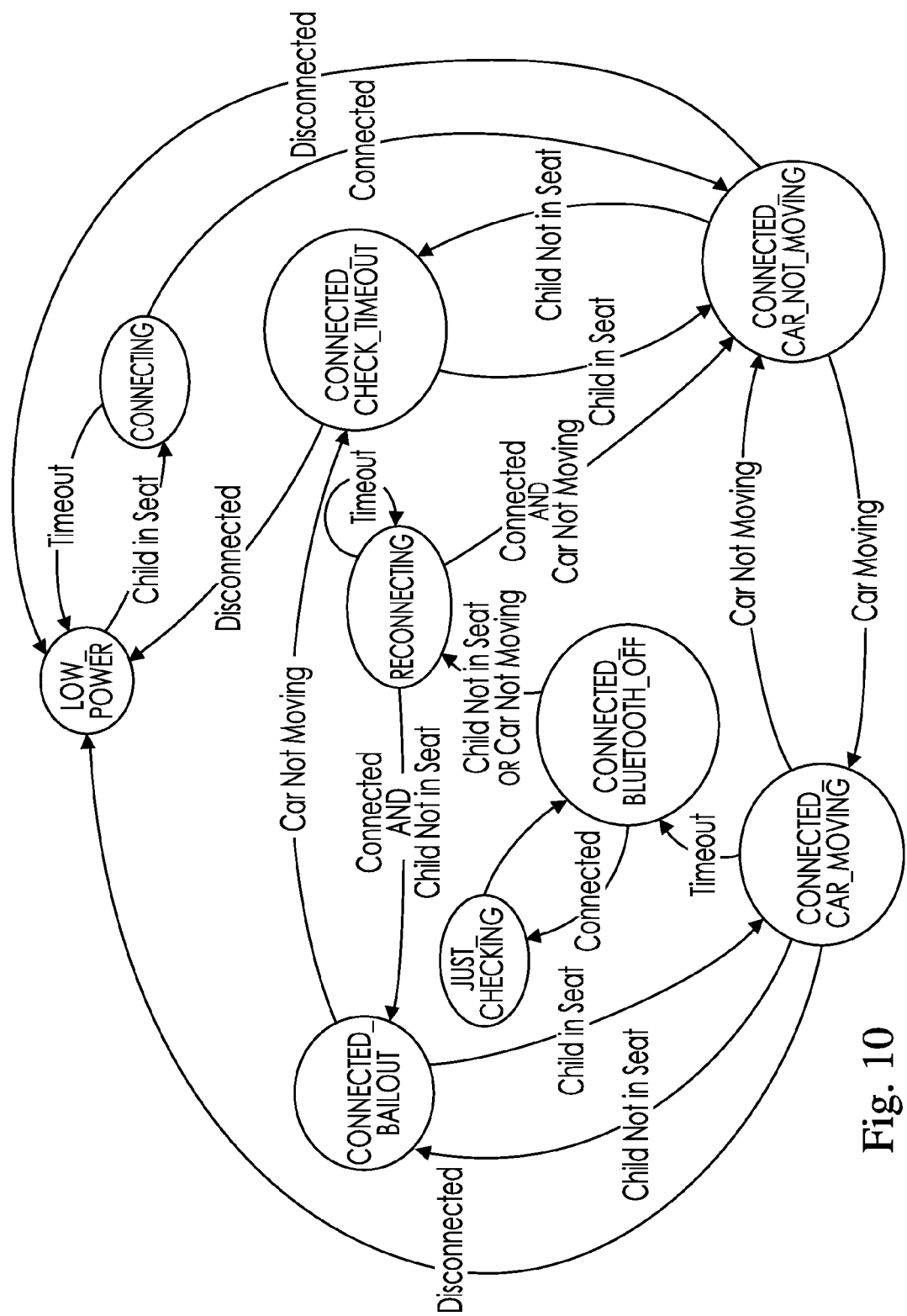
FIG. 10 provides a state diagram of an embodiment of a child seat safety system.

In the flow diagram of FIG. 8, as well as the logic diagrams of FIGS. 9 and 10, while indicating movement, it is also indicated that the monitor (2000) is entering a power save or sleep mode. This mode can be particularly useful to preserve battery life in the car seat monitor (2000). Specifically, once the car seat monitor (2000) has detected that the vehicle (105) is moving at a significant rate of speed, and has also settled into a fairly constant speed, the monitor (2000) may power down to provide less regular monitoring and to preserve battery life. This sleep mode can be characterized by the screen shot at FIG. 11. This type of sleep mode will generally not present a major danger situation as the vehicle (105) is unlikely to rapidly drop to zero speed when it is at a current high rate of speed. Similarly, the system (200) can power down if there is no child in the seat (100). In these situations, there will generally be a major change of state prior to any alarm needing to be sent. Thus, the system (200) can go from continuously monitoring, to monitoring for such change of state events only.

Figure 22:
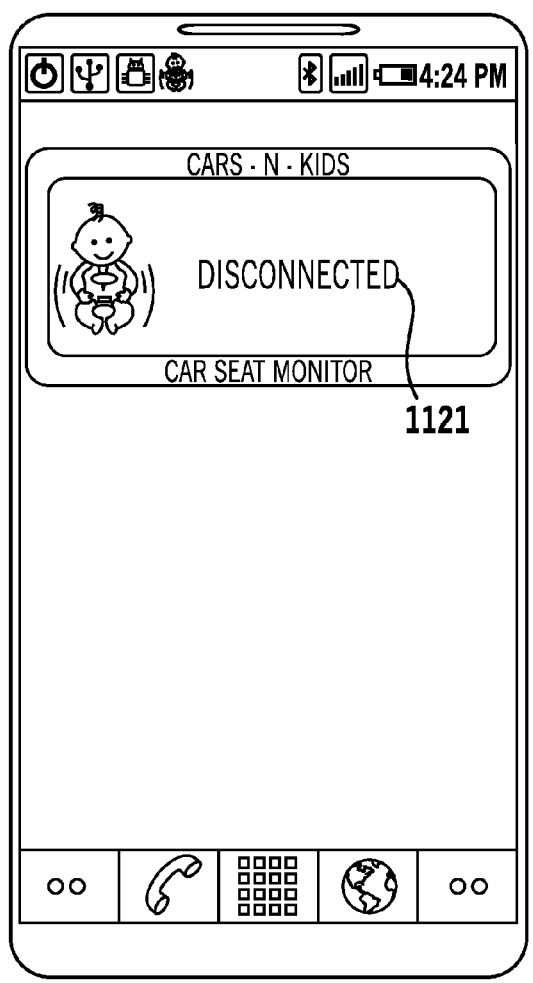

FIG. 22 would provide the equivalent of an exit screen. In this case, the monitor (2000) indicates that it is disconnecting (1121) from the car phone (215). This may be because the car seat system (200) has detected that there is no child and no motion for a long enough period of time to presume that monitoring is not necessary, or because the alarm receiver (215) is out of range of signals from the car seat monitor (2000) during a "safe" indication. The disconnect will generally only be accomplished when the system (200) is currently reading a safe situation (for example, there is no child (101) in seat (100) which is in motion). In the event that the alarm receiver (215) is approaching maximum range with a danger situation or even potential danger situation being present in the seat (100), the system (200) will generally trigger an alarm and may attempt to not lose communication.

When the monitor (2000) is communicating with vehicle (105) electronics (301) to indicate whether a child is present or not, and using this to forward signals to a remote device (215), it is generally not the case that a disconnection will not need to occur unless the vehicle (105) is physically turned completely off. Further, such forwarding of communication can also allow the vehicle (105) to make proper adjustments to the air bag modules or its own operation by knowing there is a child in the seat (100). This could allow for parents to place children in any seat (100) without the need to manually turn airbags on or off or adjust them. This later option is becoming increasing important as airbags become more pervasive in the rear of vehicles. The device can also utilize multiple forms of communication in the event that an alarm situation exists (or is possible) and the alarm receiver (215) is moving out of range. This could, in fact, trigger an alarm condition in an embodiment.

By communicating with the vehicle (105), popular systems like the GM OnStar™ system, Ford Sync™ System, and Mercedes Benz safety system (200), would allow for more advanced decisions between the monitor (2000) and the rest of the system (200) thereby enhancing the safety of its occupants and reducing injuries and fatalities, such as, but not limited to, monitoring the vehicle's (105) status, rolling windows down, unlocking doors, contacting caregivers directly, or calling 911. Interaction with onboard vehicle (105) control systems can provide for improved options of response. For example, in an embodiment, if the system (200) detects a likely child (101) in car seat (100) scenario and an indication that there is a rising internal temperature, the vehicle (105) could be remotely started and windows could be lowered or the air conditioning system activated to quickly lower the temperature. Similarly, in the event of a potential danger scenario a remote monitoring service could activate onboard cameras or microphones inside the cabin of the vehicle (105) to review the inside of the vehicle (105) and see or hear if a child (101) is present.

While the above has discussed the operation of singular devices, multiple devices (2000) and monitors (215) can be communicating on a network or independently. Thus, both mom and dad's phone can be interacting with a single vehicle seat monitor (2000) or with multiple monitors (2000). Depending on the embodiment, these independent communications may utilize the same protocols, different protocols, and the same or different networks. Mom's and dad's phones can both be in communication with the vehicle (105), or controller (231), and either can make a decision if a left child or other warning is received. Similarly, multiple vehicle seats in multiple cars can also interact with each other.

The monitor (2000) can automatically pair itself to the caregivers' phone(s), PC home computer, and/or house-monitoring system (215) or home alarm (215) when such devices are in proximity to the monitor (2000). The monitor (2000) can connect to these objects though the Internet via the caregiver's phone application, giving the status of the child (101), vehicle seat (100), and vehicle (105) conditions. It can also utilize information stored on the alarm receiver (215), such as address books and related information, to attempt to make contact with another person if there is a decision by the controller (231) that the alert may not be being received. Should an alarm continuously sound for a sufficient length of time, the system may check to see the geographical proximity between the alarm receiver (215) and the car seat monitor (2000). If this is within a few meters, the system may determine that the parent not only forgot the child, but also forgot their phone (215). It may then utilize an emergency contact routine to send an alert to a different device (e.g. a different phone (215) associated with the parents) and can even send a message to emergency personnel. For example, the system could contact an OnStar™ or other service operator to have them perform additional monitoring of the vehicle (105) (such as accessing an onboard camera or microphone) or could send a message to emergency 911 operators, including the potential situation and the global positioning coordinates of the vehicle (105), to allow them to send assistance.

FIG. 15 provides a screenshot showing pairing of the car seat device with the current alarm receiver (215). This will generally be a one time setup operation so that the alarm receiver will know to begin receiving monitoring signals from a car seat monitor (2000) when it gets in proximity to it. In effect, the pairing allows for the "arming" of the system (200). When the alarm device (215) gets in proximity of the car seat monitor (2000), the two will recognize each other and connect indicating that it is likely that monitoring will be necessary in the near future. Further, this can indicate to the car seat monitor (2000) the first receiver (215) to communicate with if an alert or monitoring message is to be sent. It should be recognized that pairing is not necessary for an alarm signal to be sent, but can provide a more effective path. While pairing can allow for an alarm which is more direct or more likely to be to the phone of a nearby parent or caregiver, the system (200) can communicate with any system it knows to communicate with in any order of progression. Thus, if a parent was to get into the car and their phone is turned off (or if it has a dead battery), the system may attempt to communicate with it in accordance with normal communication protocol. However, should a clear danger situation exist, it may cycle through alerting multiple phones (and contacting the vehicle (105) or other systems) to attempt to receive a response nonetheless, if the phone had successfully paired to the monitor (2000) in a similar situation, this may result in an escalating alarm on the phone only. In FIG. 15, the phone (215) is capable of pairing with three different devices (2000) as may be the case of a multi-child family.

Figure 16B:
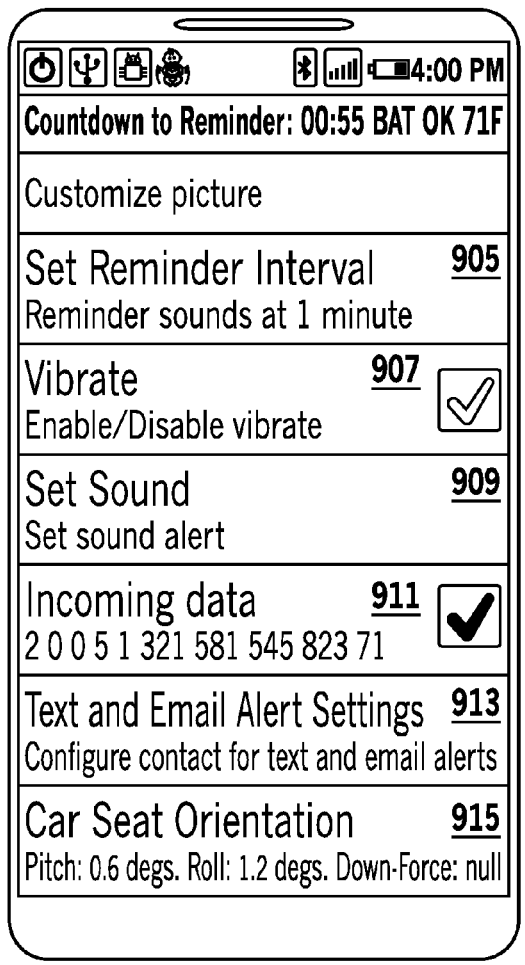
Figure 16C:
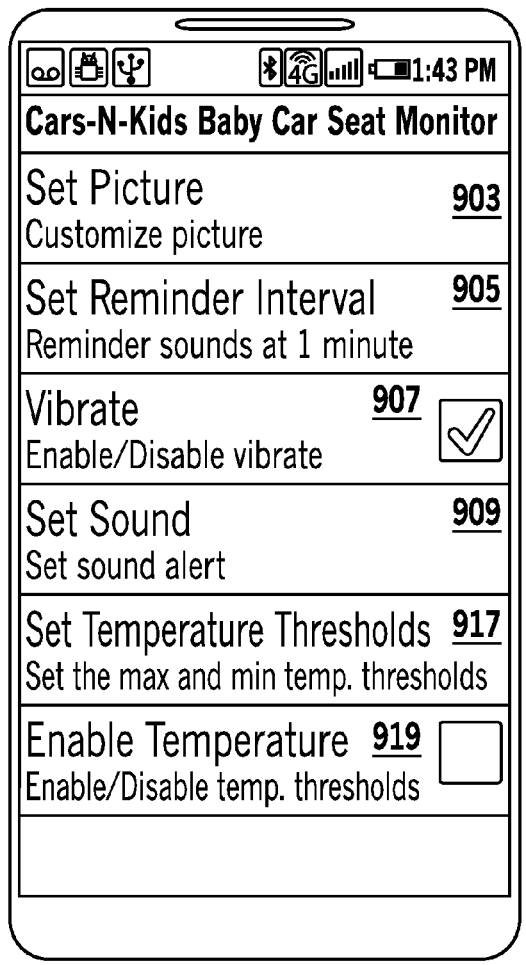

FIGS. 16A and 16B provide for menus showing various configuration options for the system. This includes which car seat devices are connected to and paired with the alarm receiver (901), a picture inclusion (903), a reminder interval between separate notifications if a notification is ignored or otherwise cancelled (905), and settings for the type of alarm including vibration (tactile) and audible (sonic) (909) alerts. The system can also detect in incoming data (911), set alternative text based alerts (913), and indicate orientation of the car seat device (915).

Figure 17:
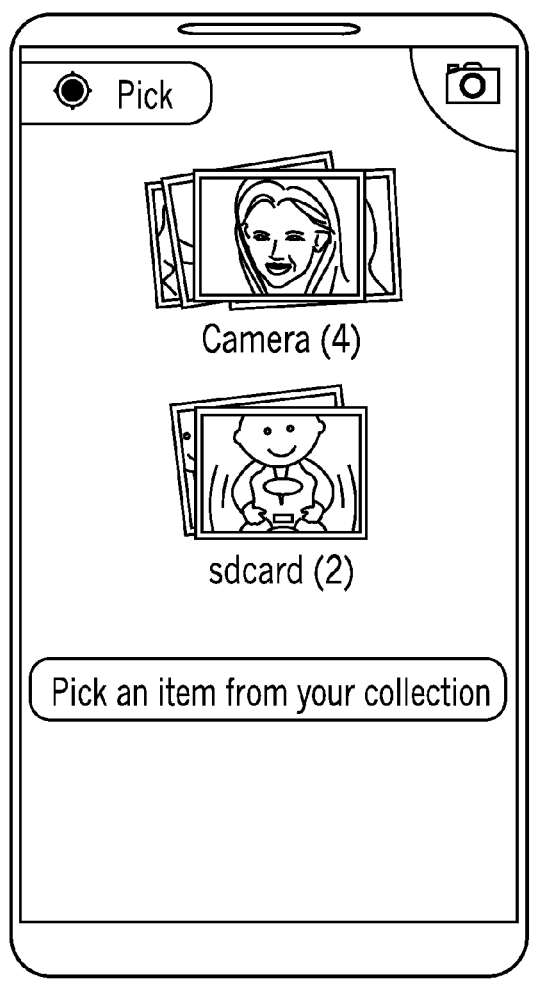

FIG. 17 provides a screen whereby a user can select photos (1203) to appear with the alert on the smartphone screen as seen in FIG. 14. Including a photo as part of the alert can serve to personalize the alert (and make it more likely to be paid attention to due to a potential emotional response) as well as allowing the system to be customized if certain children (101) use certain seats (and therefore are associated with certain car seat devices (2000)) so a parent knows which device is triggering when multiples are currently in use. This latter arrangement can be particularly beneficial for families with more than one child. For example, if dad routinely takes the first child to day care and mom the second, an alert on dad's phone may be silenced if he thinks it is to the child he has just dropped off. However, if the picture indicates it is the child his wife usually has, it can spur on further actions.

Figure 18:
Figure 19:
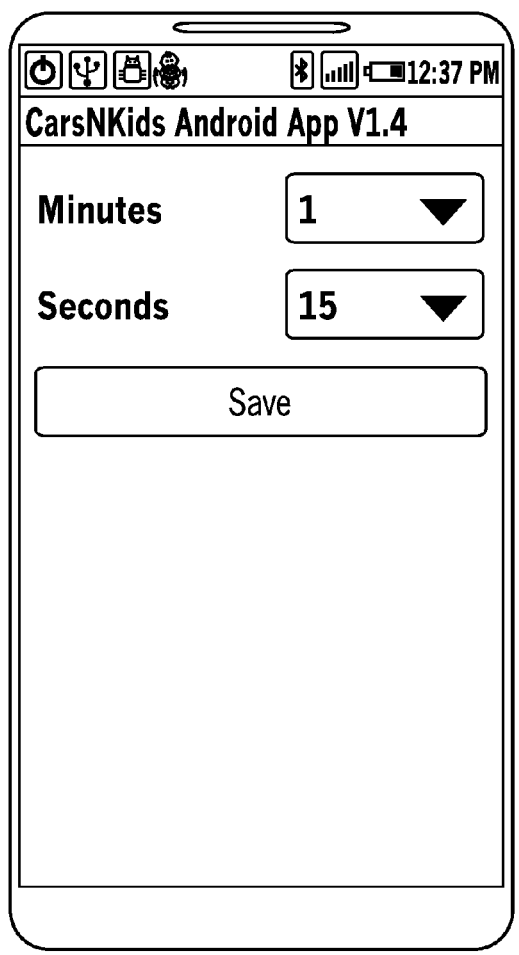

FIG. 19 provides for a screen to customize the amount of time between alerts. This allows a parent who may need to deal with many kids to not have to ignore alerts from some devices (2000) while trying to get other children (101) out of their seats (100). Alternatively, the alert can be set quicker for a new parent, or a parent who is aware that a busy schedule could make them more likely to inadvertently forget a child. FIG. 18 provides for similar customization of sounds related to each alert.

So as to illustrate alternative operations of the system, three different exemplary operations will now be described.

In the first system, the system (200) is designed to utilize two motion detectors (221) in conjunction with each other. The first motion detector (an accelerometer in this embodiment) determines if the vehicle (105) is not in operation and if so arms the system, the second motion detector (201) is used to determine if there is motion within the vehicle (105) (indicating the presence of an unattended child (101)) and trigger the notification (211).

In an operation of the system (200) in this example, an embodiment of an accelerometer (221) may work as follows. If the accelerometer (221) output changes by more than 0.1 g or 60 millivolts in any 200 millisecond period and outputs acceleration in the same direction for each of the 67 millisecond periods during this 200 millisecond period, it can be determined that the vehicle (105) is moving. A determination of movement results in a timer in the control (which may be on the order of 120 seconds) being reset to zero seconds. If the timer reaches 120 seconds and the vehicle (105) is determined to not be moving at that time (and/or has not moved during that time) the second motion sensor (201) is activated and monitored. At this point, it is assumed that the vehicle (105) is probably no longer in operation so the system needs to determine if a child (101) is present in the vehicle (105). This embodiment therefore does not arm the system (200) from the child's (101) presence, but instead arms the system (200) from the vehicle (105) being determined to not be in operation.

The logic over the 200-millisecond period on the accelerometer (211) can be to differentiate between a child (101) moving in a seat (100), which may provide some acceleration to the seat (100), which may be picked up by the accelerometer (221), and the vehicle (105) being in motion, which is also picked up by the accelerometer (221).

Movements by a child (101) (or other human interacting with the car seat) generally generate short acceleration spikes typically less than 67 milliseconds in duration. These spikes randomly accelerate and decelerate within the 67-millisecond period. In effect, the acceleration is "jerky." A vehicle (105) that is moving, on the other hand, typically exhibits a gradual increase in acceleration (in the same direction with little or no deceleration present) for periods longer than 200 milliseconds. The control system in this embodiment, is constantly looking for these cases to establish if the car is sitting still and is disregarding other possible acceleration such as a child (101) moving in the seat (100) or the seat (100) being moved by something other than vehicle (105) motion. It should be understood that through filtering in software or hardware the controller (231) could filter out the child (101) moving and the same motion detector (221) may be used for both purposes in some embodiments. For example, the controller (231) may smooth or integrate the accelerometer's return to attempt to eliminate such spikes.

The choice of delay in this case is to allow time to turn the vehicle (105) off and remove the keys, gather belongings, remove the child, and exit the vehicle (105) (which has been found to be approximately 120 seconds). In the currently discussed embodiment, if no vehicle (105) motion that is consistent with a properly started, running, or rolling (in motion) vehicle (105) is detected from the accelerometer (221) for 120 seconds, a second motion detector is enabled to detect the presence of a child (101) in the vehicle (105). When the control (231), which in this case is a microprocessor, senses a change in the output of this second motion sensor, it enables and starts another 120-second timer that counts the number of changes that occur in the next 120 seconds. If the microprocessor (231) senses a preselected number of changes during this window or if the initial pulse is continuously low for the period, the control determines that an unattended child (101) situation may exist and an alarm signal is transmitted to the alarm system (211), sounding an alarm.

If a child (101) were left in an unattended vehicle (105) that does not have the ignition on, the alarm would therefore generally activate 240 seconds after the vehicle (105) was parked. If a child (101) entered an unattended vehicle (105) and was detected by the motion sensor (221) or the car seat detector (201) without having the ignition on, the vehicle (105)'s alarm (211) would sound within around 120 seconds. If the vehicle (105) is sitting still (parked) while the engine is running, the alarm (211) will still enable itself after 120 seconds. After an additional 120 seconds with child (101) continuously present in the vehicle (105), it will also trigger the alarm (211).

In a second exemplary embodiment, the device of FIG. 1 is used and comprises a weight sensor (201) to detect the child in conjunction with an accelerometer (221) to detect vehicle (105) motion. In this situation, the weight sensor (201) serves to arm the system (200). If sufficient weight in the seat (100) to activate the system (200) is not detected, the system (200) remains in a disarmed state and the alarm (211) will not trigger. Once the system (200) is armed, the control system (231) will activate and monitor the output of the accelerometer (221). So long as vehicle (105) acceleration is detected as discussed above, the control (231) will not trigger an alarm (211). However, as soon as vehicle (105) acceleration is not detected, a short timer (for example 5 seconds) is begun. In this way, false alarms, such as if the vehicle (105) is cruising at a relatively static speed, are prevented. If the vehicle (105) has not moved in the short delay period, the alarm (211) is sounded by the control (231). In this case, playing a children's song via the speaker internal to the passenger compartment of the vehicle (105). Once a short song has played, the system (200) control (231) will go into a hold mode and a longer delay (for instance 30 seconds) will be allowed to pass to determine if the vehicle (105) motion has resumed. If it has not, the notification (211) may be sounded by the control (231) again. If motion is detected in the hold period, the system (200) will generally reset. A number of such hold periods may be used sequentially providing reminders to a parent as they are leaving their vehicle (105).

Further in this embodiment, when the child moves off of the sensor (201), the control system (231) will also detect that the system (200) is to disarm and will also trigger a notification (211) to identify that the system (200) is disarming. In this embodiment, the notification (211) plays a series of beeps or chirps to indicate that the system (200) is disarming. If the parent has purposefully removed the child (101) from the seat (100), this notifies them that the system (200) has disarmed and will not annoy them. If the child (101) is expected to still be in the seat, this provides an immediate warning to the parent that they may need to stop the vehicle (105) and check on the child (101).

In a still further example, a more integrated system is contemplated. In this embodiment, the device is integrated as part of the child seat (100). Once the child seat (100) is installed, the controller (231) detects (such as via position sensors or connections) that the seat is in a vehicle (105). When the vehicle (105) is started, the seat automatically identifies itself to the vehicle (105) whose onboard electronics are designed to recognize its presence. Upon detecting the seat, the vehicle (105) may activate a dashboard display to indicate that a child car seat (100) is present in the vehicle (105). The controller (231) may also identify the location of the seat (100) to the vehicle (105) and the vehicle (105) may automatically adjust onboard controls to compensate. For example, if the car seat (100) is installed on the right side of the back seat of the vehicle (105), the vehicle (105) may use onboard sensors to detect the seat's weight, disable a right side rear airbag, turn on child safety locks and disable window controls on the right side of the rear of the vehicle (105), and increase the tension on the right side seatbelt which is indicated to be connected and therefore potentially being used to secure the seat (100).

If the controller (231) indicates that there is a child (101) in the seat (101), the vehicle (105) may also provide a dashboard indicator light or other onboard control to indicate to the parent that the seat is occupied. After connecting with the vehicle (105), the seat may then attempt to seek out any enabled devices in the vicinity and pair with them. It may then locate mom's cell phone in her purse, as well as a GPS positioning system located on the vehicle's (105) windshield. These systems may then be engaged in a monitoring mode with software activated to receive signals from the controller (231). As multiple alarm systems (211) are present (the vehicle (105) itself, mom's phone, and the GPS system), an order of preference may be determined by the controller (231) of alarm. In this example, the GPS system will have preference to provide the first notice (as it is non-intrusive and likely will be detected by a parent in the vehicle (105)) with the phone having the second level of escalation, but if the phone begins to move away from the seat (100) the phone will become the first level of escalation. The third level of escalation may be calling Dad's phone (which is determined to not be in the car since it has not been paired with) and a fourth level of calling 911 utilizing on-board vehicle electronics or a WIFI enabled system on board the monitor (2000).

As can be seen in this embodiment, the system effectively automatically configures the vehicle (105) to adapt to the presence of the seat (100), and configures the seat (100) to go through a preferred order of alarm and notification based on the systems present that the monitor (2000) can utilize as part of the system (200). To a parent, this setup can be performed transparently or near transparently without their needing to take any action. The simple placement of the child in the seat serves to activate the cascade of events, fully arm and prepare the system (200), and provide the determined level of protection.

FIGS. 8 and 9 provide state diagrams indicating how various states can trigger different modes and operation in different embodiments in a manner similar to the above examples. The states in the depicted embodiments are discussed below.

LOW_POWER state is a state where the car seat monitor is consuming the least amount of power. When a child is detected to be in the car seat, the state will transition to the CONNECTING state.

CONNECTING state is a state where the car seat monitor (2000) is attempting to establish a connection to the smartphone (215). If a connection attempt is successful, the state will transition to the CONNECTED_CAR_NOT_MOVING state. However, if the timeout timer expires before successfully establishing a connection, the state will return to LOW_POWER state.

CONNECTED_CAR_NOT_MOVING state is a state where a child (101) is detected to be in the car seat (100) and where the vehicle (105) is determined to be not in motion. When the vehicle (105) is determined to be in motion, the state will transition to the CONNECTED_CAR_MOVING state. When the child (101) has been detected to be not in the car seat (100), the state will transition to the CONNECTED_CHECK_TIMEOUT state. If the connection is disconnected, the state will transition to the LOW_POWER state.

CONNECTED_CHECK_TIMEOUT state is a state where the vehicle (105) is not moving and the child (101) that was previously in the car seat (100) has been taken out of the car seat (100). It is also in this state where a timeout timer has been started. When the timeout timer has expired, the car seat (100) will disconnect from the smart phone determining the situation is safe. When the car seat (100) has successfully disconnected from the smartphone (215), the state will transition to the LOW_POWER state. If a child has been placed in the seat before the timeout timer has expired, the state will transition to the CONNECTED_CAR_NOT_MOVING state.

CONNECTED_CAR_MOVING state is a state where a child (101) is detected to be in the car seat (100) and where the vehicle (105) is determined to be in motion. When the vehicle (105) is determined to not be in motion, the state will transition to the CONNECTED_CAR_NOT_MOVING state; while when the child (101) has been detected to be not in the car seat (100), the state will transition to the CONNECTED_BAILOUT state. If the connection is disconnected, the state will transition to the LOW_POWER state. It is also in this state where a timeout timer has been started. When the timeout timer has expired, the car seat will transition to the CONNECTED_BLUETOOTH_OFF state.

CONNECTED_BLUETOOTH_OFF state is a state where the connection is temporarily disconnected to conserve power during long durations of vehicle (105) movement by disabling the more power hungry communication components of the device (200). When the child (101) is detected to be not in the car seat (100) or the vehicle (105) has been detected to be not in motion, the state will transition to the RECON- NECTING state. If a connection has been established by the smartphone (215), the state will transition to the JUST_CHECKING state.

CONNECTED_BAILOUT state is a state where the child (101) has been detected to be not in the car seat while the vehicle (105) is in motion (but was previously). When the child (101) is detected to be in the car seat (100), the state will transition to the CONNECTED_CAR_MOVING state. When the vehicle (105) has been detected to be not in motion, the state will transition to the CONNECTED_CHECK_TIMEOUT state.

JUST_CHECKING state is a state that indicates to the smartphone (215) that the car seat is still within range but where additional communication is generally unnecessary. The state will transition to the CONNECTED_BLUETOOTH_OFF state.

RECONNECTING state is a state where the car seat monitor (2000) is attempting to establish a connection to the smartphone (215) after temporarily disconnecting the connection due to a long duration of vehicle (105) movement. It is also in this state where a timeout timer has been started. If a connection attempt is successful and the child (101) is detected to be not in the car seat (100), the state will transition to the CONNECTED_BAILOUT state. If a connection attempt is successful and the vehicle (105) is determined to be not in motion, the state will transition to the CONNECTED_CAR_NOT_MOVING state. However, if the timeout timer expires before successfully establishing a connection, the state will return to RECONNECTING state.

While the above embodiments contemplate the use of the device in private vehicles (105), in alternative embodiments, the device can also be used on public vehicles (105). For example, school busses and day care vehicles (105) with multiple kids that could be left behind if driver does not check all seats at the end of a work day or trip. A system (200) can be installed in that vehicle (200) to detect the presence of children in the seats to make sure that a child that may be asleep on the seat is not left when the bus is parked. A similar system could also be installed on an airplane.

While the above has discussed a number of embodiments and general indications of how the system (200) can operate, there are discussed below are a number of examples of specific logic flows that can be used to determine if a danger situation exists on a circuit such as those provided in FIGS. 5A-5F and/or 24-28.

Example 1

Logic for Determining if the Vehicle (105) is Moving or not Moving

If the motion sensor (221), an accelerometer for this case, output changes by more than 0.1 g or 60 millivolts in any 200 millisecond period and outputs acceleration in the same direction for each of the 67 millisecond periods during this 200 millisecond period. It can be determined that the vehicle (105) is moving.

If these two conditions are met we assume the vehicle (105) is moving and Timer 1 (120 second timer) is reset to zero seconds. If timer 1 reaches 120 seconds the vehicle (105) is determined not to be moving, and the motion sensor and vehicle (105) seat sensor are activated and monitored. At this point it is assumed that the vehicle (105) is still and possibly turned off with a child unattended in the vehicle (105).

The software that monitors the accelerometer output is constantly looking for these cases to establish if the vehicle (105) is sitting still, a child is moving in the seat or if a child is moving in the seat while the vehicle (105) is moving. It should be noted that if a child is moving in the seat while the vehicle (105) is moving, the controller (231) will generally make the conservative (safer) decision that the vehicle (105) is not moving and enable itself. In this case the controller (231) will detect accelerations and decelerations of the child moving in addition to the vehicle (105) decelerating or accelerating.

This case is the summation of two cases: Case 1 is the Detection of the higher frequency movement caused by the movement of the child in the seat. Case 2 is the constant Acceleration or deceleration of the vehicle (105). It should be understood that through filtering in software or hardware one could filter out the child moving.

Example 2

Logic for Motion Detector 2 to Sound Alarm

If no vehicle (105) motion that is consistent with a properly started, running or rolling vehicle (105) is detected from the vehicle (105) motion sensors (1) for 120 seconds the Motion detector (2) is enabled to detect the presence of an intruder or child in the vehicle (105).

When the Microprocessor senses a change in the output of Motion sensor 2, it enables and starts another 120-second timer that counts the number of Motion detector 2 changes that occur in the next 120 seconds. If the microprocessor senses 2 (2 being an arbitrary number to avoid false alarms) or more changes within this 120-second timer window or if the initial pulse is continuously low for 120 seconds an alarm signal is transmitted to activate any combination of systems or devices mentioned in section 1, If one (one being an arbitrary number) pulse less than 120 seconds in duration is detected nothing happens.

Example 3

Logic for Vehicle (105) Seat Detector to Sound Alarm

If the child detector circuit (201) detects the presence of a child (101) its output state changes. When the controller (231) senses this change it starts a 120 second timer that counts the number of changes that occur within 120 seconds. If the controller (231) senses more than two changes within this 120-second timer window or if the change of state is continuous for 120 seconds an alarm signal is transmitted to any combination of the systems and devices mentioned in section 1.

120 seconds was chosen to allow time to Open the vehicle (105) door, secure the child and any belongings into the vehicle (105) (Approximately 100 seconds) Close doors and Start vehicle (105) Approximately 20 seconds. 120 seconds was chosen to allow additional time on top of the 120 seconds to remove the child from the vehicle (105) seat.

If a child were left in an unattended vehicle (105) that does not have the ignition on, the alarm would activate 240 seconds after the vehicle (105) was parked.

If a child entered an unattended vehicle (105) and was detected by the motion sensor or the vehicle (105) seat detector without having the ignition on, the vehicle (105)s alarm would sound within 120 seconds.

If the vehicle (105) is sitting still (parked) while the engine is running the alarm will still enable itself after 120 seconds and after an additional 120 seconds with child continuously present in the vehicle (105), it will start transmitting signals to any combination of the systems and devices mentioned in section 1. As long as the vehicle (105) is running the actual vehicle (105) panic alarm will not sound. The car's electronics prevent the panic alarm from sounding via Key Fob panic signal when the key is the accessory position or the vehicle (105) is running.

However it needs to be understood in this case, if you turn the vehicle (105) off anywhere in this first 120 second window after the vehicle (105) is parked, you will have somewhere between 0 and 240 seconds to remove the child from the vehicle (105) before the alarm is sounded. This is because for this example the alarm system is enabled 120 seconds after the vehicle (105) stops moving, not 120 seconds after the ignition is turned off.

In the case of the alarm sounding it can simply be deactivated by pressing the driver's key chain panic button or starting the vehicle (105). In this case the vehicle (105) seat safety systems is still enabled and is fully functional and will sound the alarm within 120 seconds if a child is detected inside the vehicle (105).

It is understood that variations in logic and filtering for enabling the sensors and activating the alarm could be applied to effectively detect the presence of a child in the vehicle (105) or vehicle (105) seat. For example all of the sensors could be continuously powered and monitored or the system could also be configured to detect when the engine is turned off versus when the vehicle (105) stops moving.

While the invention has been disclosed in connection with certain preferred embodiments, this should not be taken as a limitation to all of the provided details. Modifications and variations of the described embodiments may be made without departing from the spirit and scope of the invention, and other embodiments should be understood to be encompassed in the present disclosure as would be understood by those of ordinary skill in the art.

The invention claimed is:

1. A method for determining if a vehicle is in motion, the method comprising:
    providing a three-dimensional accelerometer placed in a vehicle and a processor for processing the output of such accelerometer;
    measuring said output for all three dimensions of said accelerometer in a specified time period;
    averaging said output for each of said three dimensions in said specified time period to provide a cluster;
    creating an array of said clusters having a fixed length;
    comparing consecutive clusters in said array to determine if there is a change in any dimension;
    if there is a change in any dimension: determining a magnitude of that change and comparing the magnitude against a fixed value;
    if there is both a change in said dimension and said magnitude of said change is above said fixed value, increasing a tally;
    otherwise, decreasing said tally; and
    using said tally to determine if said vehicle is in motion.

2. A non-transitory computer readable media comprising:
    computer readable instructions for measuring the output of all three dimensions of a three dimensional accelerometer in a specified time period;
    computer readable instructions for averaging said output for each of said three dimensions in said specified time period to provide a cluster;
    computer readable instructions for creating an array of said clusters having a fixed length;
    computer readable instructions for comparing consecutive clusters in said array to determine if there is a change in any dimension;
    computer readable instructions for determining a magnitude of that change and comparing the magnitude against a fixed value, if there is a change in any dimension;
    computer readable instructions for increasing a tally, if there is both a change in said dimension and said magnitude of said change is above said fixed value;
    otherwise, computer readable instruction for decreasing said tally; and
    computer readable instructions for using said tally to determine if said vehicle is in motion.

* * * * *